(12) United States Patent
Shinohara et al.

(10) Patent No.: US 11,067,826 B2
(45) Date of Patent: Jul. 20, 2021

(54) OPTICAL DEVICE FOR PRESENTING A STEREOSCOPIC IMAGE

(71) Applicant: OMRON Corporation, Kyoto (JP)

(72) Inventors: Masayuki Shinohara, Kyoto (JP); Yasuhiro Tanoue, Kyoto (JP); Gouo Kurata, Kyoto (JP); Norikazu Kitamura, Kyoto (JP); Kazuyuki Okada, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/318,028

(22) PCT Filed: Jul. 18, 2017

(86) PCT No.: PCT/JP2017/025981
§ 371 (c)(1),
(2) Date: Jan. 15, 2019

(87) PCT Pub. No.: WO2018/025628
PCT Pub. Date: Feb. 8, 2018

(65) Prior Publication Data
US 2019/0235263 A1 Aug. 1, 2019

(30) Foreign Application Priority Data
Aug. 4, 2016 (JP) .............................. JP2016-153845

(51) Int. Cl.
*G02B 30/56* (2020.01)
*G09F 13/18* (2006.01)
(Continued)

(52) U.S. Cl.
CPC ................ *G02B 30/56* (2020.01); *F21S 2/00* (2013.01); *G02B 6/003* (2013.01); *G02B 6/0036* (2013.01);
(Continued)

(58) Field of Classification Search
CPC ...... G02B 30/56; G02B 30/00; G02B 6/0036; G02B 6/003; G09F 19/12; G09F 13/18; G03B 35/18; F21S 2/00
See application file for complete search history.

(56) References Cited

U.S. PATENT DOCUMENTS 9,285,597 B2 * 3/2016 Minami ............... G02B 6/0043
9,360,616 B2 * 6/2016 Yang .................... G02B 6/0061
(Continued)

FOREIGN PATENT DOCUMENTS

CN 102563401 A 7/2012
EP 2757314 A2 7/2014
(Continued)

OTHER PUBLICATIONS

Machine translation from EPO for Fujikura JP5701434B1 Display Device and Display Method, 2015, 25 pages (Year: 2015).*
(Continued)

*Primary Examiner* — Andrew Jordan
(74) *Attorney, Agent, or Firm* — Osha Bergman Watanabe & Burton LLP

(57) ABSTRACT

An optical device includes a light guide plate configured to guide light entering therein, and cause said light to exit from an emission surface thereof and thereby form an image in a space; a group of narrow-view optical-path deflectors configured to form an image in a space within a narrow view direction taken as greater than or equal to 0° and less than a first angle relative to a reference plane that is orthogonal to the emission surface and parallel to a side surface of the light guide plate; and a group of wide-view optical-path deflectors configured to form an image in a space within a wide view direction taken as greater than or equal to the first angle and less than 90° relative to the reference plane. The group of narrow-view optical-path deflectors and the group
(Continued)

of wide-view optical-path deflectors have different image forming conditions.

5 Claims, 58 Drawing Sheets

(51) Int. Cl.
  *F21S 2/00* (2016.01)
  *G03B 35/18* (2021.01)
  *G09F 19/12* (2006.01)
  *G02B 30/00* (2020.01)
  *F21V 8/00* (2006.01)
(52) U.S. Cl.
  CPC ............ *G02B 30/00* (2020.01); *G03B 35/18* (2013.01); *G09F 13/18* (2013.01); *G09F 19/12* (2013.01)

(56) References Cited

U.S. PATENT DOCUMENTS

| | | | | |
|---|---|---|---|---|
| 10,114,226 | B2 * | 10/2018 | Shinohara | G09F 19/12 |
| 10,262,510 | B2 * | 4/2019 | Osumi | G08B 7/066 |
| 10,545,274 | B2 * | 1/2020 | Kitamura | G02B 6/0068 |
| 10,598,845 | B2 * | 3/2020 | Shinohara | G09F 13/18 |
| 2012/0075698 | A1 | 3/2012 | Minami | |
| 2014/0160562 | A1 | 6/2014 | Minami | |
| 2014/0204611 | A1 * | 7/2014 | Yang | G02B 6/0038 362/611 |
| 2014/0268327 | A1 | 9/2014 | Dunn et al. | |
| 2015/0092441 | A1 * | 4/2015 | Takagi | G02B 6/0038 362/608 |
| 2017/0192244 | A1 | 7/2017 | Shinohara et al. | |
| 2017/0371088 | A1 | 12/2017 | Kitamura et al. | |
| 2018/0180792 | A1 * | 6/2018 | Shinohara | G02B 6/0033 |
| 2018/0182213 | A1 * | 6/2018 | Osumi | G08B 7/066 |
| 2019/0235263 | A1 * | 8/2019 | Shinohara | G02B 6/0036 |

FOREIGN PATENT DOCUMENTS

| | | |
|---|---|---|
| JP | 2012-118378 A | 6/2012 |
| JP | 5701434 B1 | 4/2015 |
| JP | 5861797 B1 | 2/2016 |
| WO | 2016/114104 A1 | 7/2016 |

OTHER PUBLICATIONS

Office Action in corresponding Japanese Application No. 2016-153845 dated Sep. 3, 2019 (4 pages).
International Search Report issued in Application No. PCT/JP2017/025981, dated Sep. 5, 2017 (3 pages).
Written Opinion issued in International Application No. PCT/JP2017/025981, dated Sep. 5, 2017 (6 pages).
Office Action issued in Chinese Application No. 201780042498.X, dated Aug. 31, 2020 (14 pages).

* cited by examiner

Arrow perpendicular to light guide plate
viewed from below at the front

Arrow perpendicular to light guide plate
viewed diagonally from below

Arrow perpendicular to light guide plate
viewed from below at the front

Arrow perpendicular to light guide plate
viewed diagonally from below

OPTICAL DEVICE FOR PRESENTING A STEREOSCOPIC IMAGE

BACKGROUND

Field

The present invention relates to an optical device that presents a stereoscopic image.

Related Art

The image display device disclosed in Japanese Patent Publication No. 2012-118378 (published Jun. 21, 2012) provides one example of a known optical device that presents a stereoscopic image.

Japanese Patent Publication No. 2012-118378 discloses an image display device 100 equipped with a light guide plate 110, a light source 101 provided at an end of the light guide plate 110. Left-eye display patterns 111a, 112a, 113a having a plurality of first prisms and right-eye display patterns 111ba, 112ba, 113ba having a plurality of second prisms are formed on the rear surface of the light guide plate 110 (FIG. 28A). The aforementioned left-eye display pattern 111a uses a plurality of prisms P1 to create a symbol "A" in a two-dimensional plane, and the right-eye display pattern 111b use a plurality of prisms P2 to create a symbol "A" in a two-dimensional plane (FIG. 28B).

In this configuration, the plurality of first and second prisms reflect light from the light source 101 to thereby present a left-eye image and a right-eye image toward the front surface of the light guide plate 110. When an observer views the left-eye image and the right-eye image, the observer perceives each of the observed images 120 of "A", B", and "C" as planar images that appear three-dimensional and arranged in that order from furthest to nearest as illustrated in FIG. 28C. The observed images 120 are perceived as floating at the intersection of the optical paths of the light rays from the left-eye images and right-eye images; therefore, the observed images with larger intervals have intersection points closer to the observer and thus appear even closer to the observer. Accordingly, the observer is able to perceive a natural three-dimensional presentation.

SUMMARY

For instance, consider a stereoscopic image emerging sideways from a wall three meters (3 m) ahead along a corridor as seen by an observer one meter (1 m) away from a wall (FIG. 29A). In order for the observer to recognize this as a stereoscopic image, the observer must view the image from at least 75° relative to the normal of the wall (FIG. 29B).

However, an existing image display device 100 is at a disadvantage in that the stereoscopic image produced thereby in the space appears distorted; the stereoscopic image also hardly appears three dimensional at a wide viewing angle which is more than 60° relative to the normal of the wall.

This occurs for two reasons.

First, consider light in the light guide plate has an emission angle γ relative to the normal of the emission surface (FIG. 30A); at an emission angle γ=30°, the spread sensitivity is roughly 1 and the shape of the stereoscopic image is less sensitive to spread. However, at the emission angle γ=75°, the spread sensitivity is roughly 19 and the shape of the stereoscopic image is more sensitive to spread. The spread sensitivity of the shape of the stereoscopic image increases drastically when the emission angle γ=60°. This is because errors in the shape largely impact blurring in the sections within a wide viewing angle where the emission angle γ is greater than or equal to 75°. Here, "spread sensitivity" is the ratio of the amount of change in the emission angle of light emitted at 0° to the normal of the emission surface with a small change to the angle at which light is directed in the light guide plate (i.e., the light guide angle) to the amount of change in the emission angle of light emitted in multiple directions with a small change to the light guide angle. The spread sensitivity is 1 when the emission angle is 0°.

Second, when the stereoscopic image is produced, blurring is less likely to occur because a narrow range is visible at a viewing angle of 0°, while blurring tends to be more obvious because more of the light emitted from a wide range is seen from sections at the wide viewing angle of 60° (FIG. 31).

One or more embodiments of the present invention aims to provide an optical device capable of preventing the visibility of a stereoscopic image from deteriorating in a space within a wide view direction.

An optical device according to one or more embodiments of the present invention is configured such that the optical device includes: a light guide plate configured to guide light entering therein from a light source, change the optical path of light guided, and cause said light to exit from an emission surface of the light guide plate and thereby form an image in a space; a group of narrow-view optical-path deflectors configured to form an image in a space within a narrow view direction taken as greater than or equal to 0° and less than a first angle relative to a reference plane that is orthogonal to the emission surface and parallel to a side surface of the light guide plate; and a group of wide-view optical-path deflectors configured to form an image in a space within a wide view direction taken as greater than or equal to the first angle and less than 90° relative to the reference plane; and the group of narrow-view optical-path deflectors and the group of wide-view optical-path deflectors with different image forming conditions.

One or more embodiments of the invention provide an optical device that exhibit the effect of preventing the visibility of a stereoscopic image from deteriorating in a space within a wide view direction.

BRIEF DESCRIPTION OF THE DRAWINGS

FIG. 13A is a plan view illustrating the two-dimensional image forming an arrow made up of a plurality of dots.

DETAILED DESCRIPTION

Embodiments of the invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

A first embodiment of the present invention is described below with reference to FIG. 1A through FIG. 17.

Configuration of the Optical Device

Figure 1A:
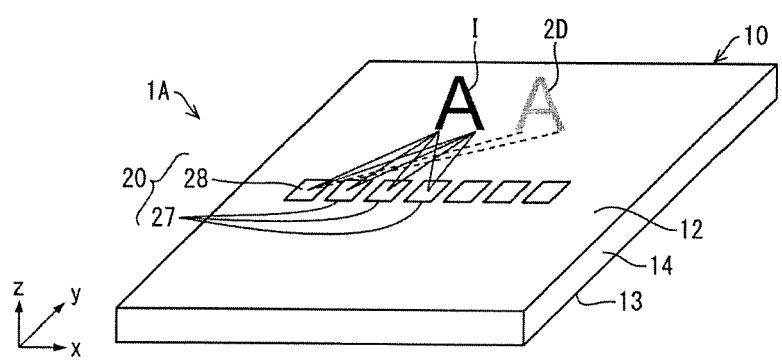
FIG. 1A is a perspective view of an optical device according to a first embodiment of the present invention and illustrates a configuration of an optical device that produces a stereoscopic image and a two-dimensional image in a space.
Figure 1B:
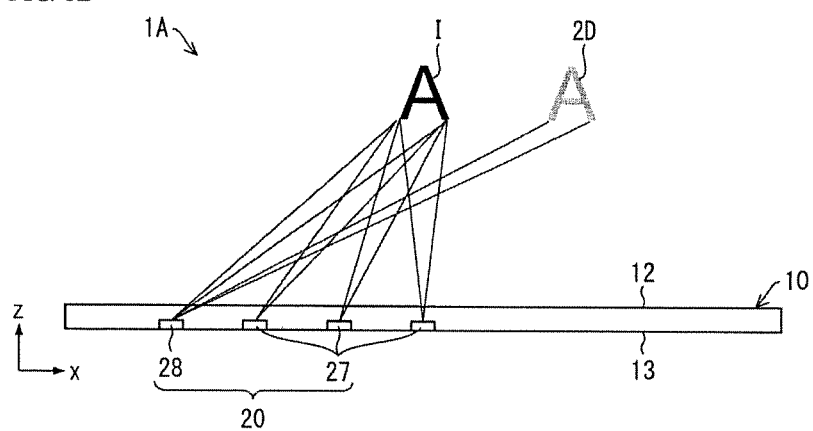
FIG. 1B is a cross-sectional view of the xz plane illustrating a configuration of the optical device producing the stereoscopic image and the two-dimensional image in a space.
Figure 2:
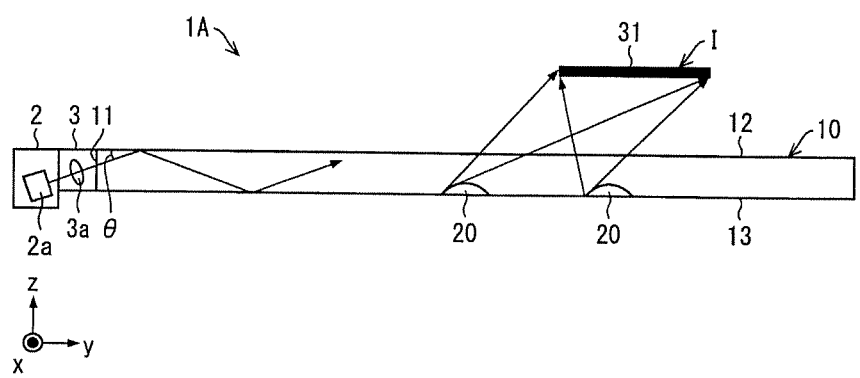
FIG. 2 is a cross-sectional view illustrating a configuration of the optical device.

The configuration of an optical device 1A according to the first embodiment is described on the basis of FIGS. 1A, 1B, 1C and FIG. 2. FIG. 1A is a perspective view of an optical device 1A according to a first embodiment of the present invention and illustrates a configuration of the optical device 1A producing a stereoscopic image I and a two-dimensional image 2D in a space; FIG. 1B is a cross-sectional view of the xz plane illustrating a configuration of the optical device 1A producing the stereoscopic image I and the two-dimensional image 2D in a space; FIG. 2 is a cross-sectional view illustrating a configuration of the optical device 1A.

As illustrated in FIG. 2, the optical device 1A of the first embodiment includes a light source 2, a light guide plate 10, and a plurality of optical-path deflectors 20 arranged in the light guide plate 10. The light guide plate 10 emits light entering therein from the light source 2 via the emission surface 12, and the plurality of optical-path deflectors 20 changes the optical path of light directed thereto, causing the light to exit from the light guide plate 10 and form a stereoscopic image I in a space.

The plurality of optical-path deflectors 20 in the first embodiment contain a group of narrow-view optical-path deflectors 27 and a group of wide-view optical-path deflectors 28 (FIG. 1A and FIG. 1B). The group of narrow-view optical-path deflectors 27 cause the stereoscopic image I to form in a space within a narrow view direction, which is from 0° or greater to less than a first angle relative to a reference plane. The group of wide-view optical-path deflectors 28 cause an image to form in a space within a wide view direction, which is greater than or equal to the first angle and less than 90° relative to the reference plane. Note that the reference plane is orthogonal to the emission surface 12 of the light guide plate 10 and parallel to a side surface 14.

The light source 2 may be made up of a plurality of light emitting diodes (LED 2a), for instance, as illustrated in FIG. 2; the light emitted from each of the light emitting diodes (LED 2a) is modified by a light-incidence tuning portion 3 and enters the incidence surface 11 of the light guide plate 10. While in the first embodiment the light source 2 may be made up of a plurality of light emitting diodes (LED 2a), the light source 2 is not limited thereto, and may be constituted by a single light emitting diode (LED 2a).

The light-incidence tuning portion 3 is provided with a plurality of lenses 3a which correspond individually to the light emitting diodes (LED 2a). Each of the lenses 3a may reduce, increase, or change the spread of light emitted from the corresponding light emitting diode (LED 2a) along the optical axis thereof in the xy plane. As a result, a lens 3a may cause light emitted from the light emitting diode (LED 2a) to approach parallel light, or may direct the light to all regions inside the light guide plate 10. The spread angle of light directed by the light guide plate 10 is no greater than 5° and, according to one or more embodiments of the present invention, is less than 1°. Other configurations may be used to reduce the spread angle of light within the xy plane in the light guide plate 10; for example, the light-incidence tuning portion 3 may possess a mask having a window that is less than a predetermined width in the x axis direction.

Here, the optical axis of light emitted from the light emitting diodes (LED 2a) in the first embodiment has an angle θ relative to the emission surface 12 (later described). For example, the angle θ, which is an acute angle between the optical axis of the light emitted from the light emitting diode (LED 2a) and the emission surface 12, is roughly 20°. Therefore, even if the light entering the light guide plate 10 is almost parallel light, it is possible to increase the amount of light that repeatedly reflects between the emission surface 12 and the rear surface 13 (later described) and is directed through the light guide plate 10 compared to when the optical axis of incident light is parallel to the y axis. Consequently, it is possible to increase the light intensity of light entering the later-described optical-path deflectors 20 compared to when the optical axis of the incident light is parallel to the y axis.

The light guide plate 10 is a transparent resin material with a relatively high index of refraction. The light guide plate 10 may be produced from, for instance, a polycarbonate resin (PC), a poly methyl methacrylate resin (PMMA), glass or the like.

The light guide plate 10 includes: an incidence surface 11 where light enters from the light source 2; an emission surface 12 which is the front surface of the light guide plate 10 and which emits light; and a rear surface 13 whereon the optical-path deflectors 20 are formed.

In the first embodiment, light exits from the emission surface 12 of the light guide plate 10 and said emission of light forms a stereoscopic image I in a space. An observer recognizes the stereoscopic image I as three-dimensional. Note that the stereoscopic image I may also be perceived to exist at a location that is different from the emission surface 12 of the light guide plate 10. The stereoscopic image I may also perceived as a two-dimensional image in a location away from the emission surface 12 of the light guide plate 10. In other words, the stereoscopic image I may not only be recognized as having a solid shape, but may also include the concept of images with two-dimensional forms that are perceived in a location different from the optical device 1A. The stereoscopic image I in the first embodiment is described as located further along the positive z axis than the emission surface 12. However, there are cases where stereoscopic image I may also be located further along the negative z axis than the emission surface 12.

Note that a rectangular coordinate system of x axis, y axis, and z axis is used at times in describing the first embodiment. In the first embodiment, the z axis direction is defined as a direction perpendicular to the emission surface 12, where the positive Z axis is from the rear surface 13 toward the emission surface 12. The y axis direction is defined as perpendicular to the incidence surface 11 where the positive y axis direction is from the incident surface 11 toward a planar image FI facing the incident surface 11. Further, the x axis is along a direction orthogonal to the incident surface 11 along a lateral surface of the light guide plate 10, where the positive x axis direction is from the left side surface toward the right side surface in FIG. 1. To avoid redundancy in the description, planes parallel to the xy, yz, and xz planes are sometimes referred to as the xy plane, yz plane, and the xz plane, respectively.

The optical device 1A in the first embodiment includes a plurality of optical-path deflectors 20 on the rear surface 13 of the light guide plate 10. The optical-path deflectors 20 change the optical path of light directed thereto by the light guide plate 10 causing the light to exit therefrom and form a stereoscopic image I in a space. The optical-path deflectors 20 are formed at mutually different positions two-dimensionally, e.g., in a matrix, in the xy plane. For instance, the optical-path deflectors 20 may be prisms.

That is, as above described the light emitted from light source 2 enters the incidence surface 11 of the light guide plate 10 via the light-incidence tuning portion 3 as illustrated in FIG. 2. The light entering the light guide plate 10 is totally reflected between the emission surface 12 and the rear surface 13 of the light guide plate 10 and is directed to the farther end of the light guide plate 10. The optical-path deflectors 20 change the optical path of light that does not satisfy the conditions for total reflection toward a specific orientation and causes that light to exit from the emission surface 12.

The group of narrow-view optical-path deflectors 27 and the group of wide-view optical-path deflectors 28 in the optical device 1A forms a stereoscopic image I; this stereoscopic image I may be created from a line image or may be a planar image forming a predetermined shape in a space.

The configuration and function of a group of first optical-path deflectors that make up the group of narrow-view optical-path deflectors 27 and the group of wide-view optical-path deflectors 28 is described below. This group of first optical-path deflectors acts as a planar-image forming unit that create a planar image. The configuration and function of a group of second optical-path deflectors that create a line image is also described.

Forming a Planar Image

Figure 3:
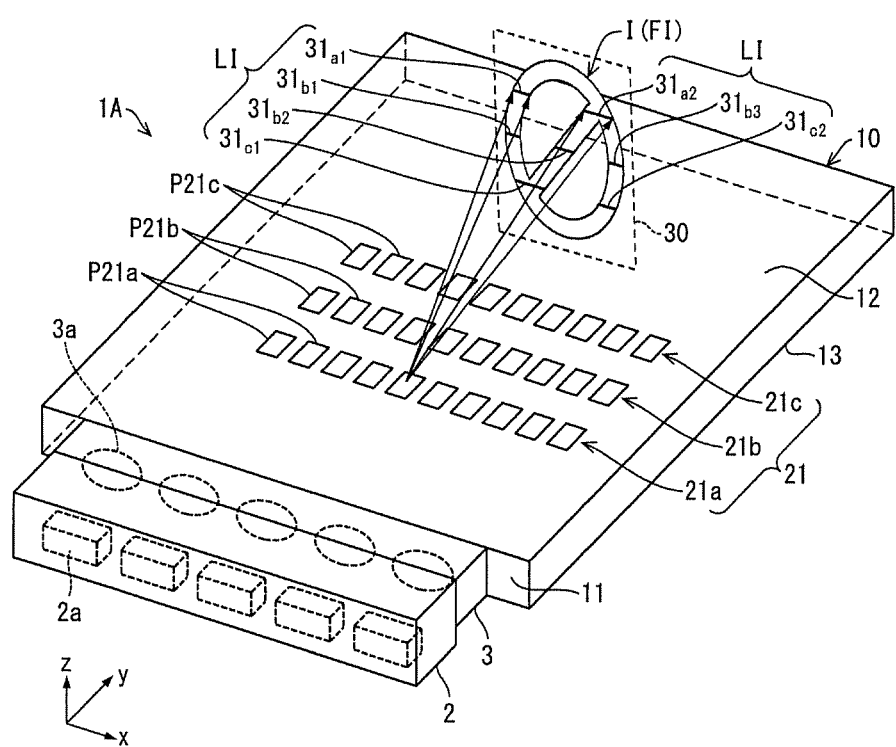
FIG. 3 is a perspective view of the configuration within the optical device for forming a planar image.
Figure 4:
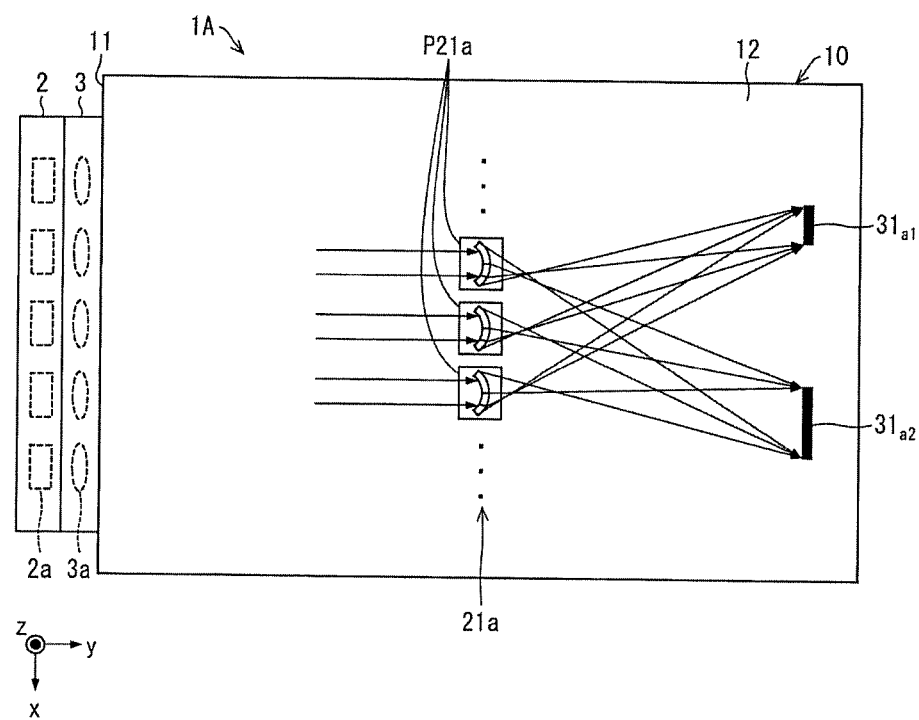
FIG. 4 is a plan view of the configuration within the optical device for forming a planar image.
Figure 5:
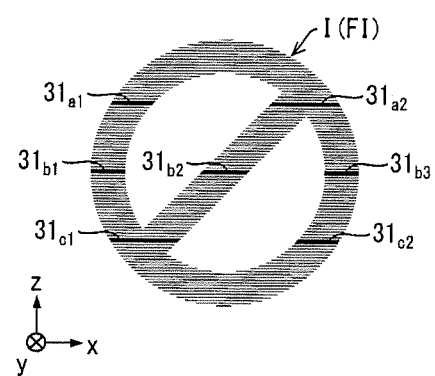
FIG. 5 is a front view illustrating an example of a stereoscopic image made up of a planar image formed by the optical device.

First, the configuration of the optical device 1A in the first embodiment for forming a planar image FI is described below on the basis of FIG. 3 through FIG. 5. FIG. 3 is a perspective view of the configuration within the optical device for forming a planar image FI; FIG. 4 is a plan view of the configuration within the optical device 1A for forming the planar image; and FIG. 5 is a front view illustrating an example of a stereoscopic image I made up of the planar image FI formed by the optical device 1A.

Assume, for example, that the optical device 1A produces a stereoscopic image I in a stereoscopic image forming plane that is parallel to the xz plane as illustrated in FIG. 3; and more specifically, that the optical device 1A forms a planar image FI as a circle with a diagonal line therethrough.

According to one or more embodiments of the present invention, the optical device 1A ensures that the light propagating through the light guide plate 10 spreads widely in the xy plane. Therefore, the light-incidence tuning portion 3 does not reduce the spread angle of light from the light source 2 in the xy plane. That is, the light-incidence tuning portion 3 does not affect the spread angle of light from the light source 2 in the yz plane for the most part.

For example, the lens 3a in the light-incidence tuning portion 3 may be a convex cylindrical lens that is curved in the xy plane and has essentially no curve in the yz plane. Both surfaces of the cylindrical lens may be convex.

A plurality of groups of first optical-path deflectors 21a, 21b, 21c, . . . is formed on the rear surface 13 of the light guide plate 10 in the optical device 1A; the groups of first optical-path deflectors 21a, 21b, 21c, . . . serve as the group of planar-image optical-path deflectors 21. Each group of the first optical-path deflectors 21a, 21b, 21c, . . . is formed from a plurality of prisms provided along a direction parallel to the x axis. For example, the group of first optical-path deflectors 21a is made up of a plurality of prisms P21a. Similarly, the group of first optical-path deflectors 21b is made up of a plurality of prisms P21b, and the group of first optical-path deflectors 21c is made up of a plurality of prisms P21c.

For example, the prisms P21a changes the path of incident light, spreading the light in a direction parallel to the xy plane, and causing the light to exit from the emission surface 12. The light beams emitted from the emission surface 12 due to the prisms P21a are, for the most part, a line intersecting with the stereoscopic image forming plane 30. As illustrated in FIG. 3 and FIG. 4, the prisms P21a cause the light beams to exit from the emission surface 12. The two light beams emitted intersect with the stereoscopic image forming plane 30 at line 31a1 and line 31a2. As illustrated in FIG. 3, any of the prisms P21a included in the group of first optical-path deflectors 21a and other prisms P21a therein similarly cause light beams to exit from the emission surface 12 and intersect with the stereoscopic image forming plane 30 at the line 31a1 and the line 31a2. The line 31a1 and the line 31a2 are substantially within a plane parallel to the xy plane, and form a portion of the stereoscopic image I. Thus, light from the multiple prisms P21a belonging to the group of first optical-path deflectors 21a form the line 31a1 and the line 31a2 in the line image LI. The light forming images of the line 31a1 and the line 31a2 may be provided by at least two prisms P21a, P21a located at different positions along the x axis direction in the group of first optical-path deflectors 21a.

That is, the plurality of prisms P21a belonging to the group of first optical-path deflectors 21a causes light incident thereon to spread along the x axis direction within a plane parallel to the emission surface 12; the plurality of prisms P21a causes light having an intensity distribution according to the images of the line 31a1 and the line 31a2 to exit from the emission surface 12. Hereby, light from the plurality of prisms P21a belonging to the group of first optical-path deflectors 21a and arranged along the x axis direction is the light that forms the image of the line 31a1 and the line 31a2.

As illustrated in FIG. 3, the prisms P21b in the group of first optical-path deflectors 21b similarly changes the optical path of light incident thereon, spreads the light in a direction parallel to the xy plane, and causes three light beams to exit from the emission surface 12. The three light beams emitted from the emission surface 12 intersect with the stereoscopic image forming plane 30 at the line 31b1, line 31b2, and line 31b3. Any of the prisms P21b included in the group of first optical-path deflectors 21b and other prisms P21b therein similarly cause light beams to exit from the emission surface 12 and intersect with the stereoscopic image forming plane 30 at the lines 31b1, 31b2, 31b3. Thus, the plurality of prisms P21b belonging to the group of first optical-path deflectors 21b causes light incident thereon to spread within a plane parallel to the emission surface 12; the plurality of prisms P21b causes light having an intensity distribution according to the images of the lines 31b1, 31b2, 31b3 to exit from the emission surface 12. Hereby, light from the plurality of prisms P21b belonging to the group of first optical-path deflectors 21b and arranged along the x axis direction is the light that forms the image of the lines 31b1, 31b2, 31b3. The lines 31b1, 31b2, 31b3 are substantially within a plane parallel to the xy plane, and form a portion of the stereoscopic image I.

Here, the lines 31b1, 31b2, 31b3 and the lines 31a1, 31a2 are formed at different locations along the z axis direction in the stereoscopic image forming plane 30.

As illustrated in FIG. 3, the prisms P21c in the group of first optical-path deflectors 21c similarly changes the optical path of light incident thereon, spreads the light in a direction parallel to the xy plane, and causes two light beams to exit from the emission surface 12. The two light beams emitted from the emission surface 12 intersect with the stereoscopic image forming plane 30 at the line 31c1 and line 31c2. Any of the prisms P21c included in the group of first optical-path deflectors 21c and other prisms P21c therein similarly cause light beams to exit from the emission surface 12 and intersect with the stereoscopic image forming plane 30 at the lines 31c1, 31c2. Therefore, the plurality of prisms P21c belonging to the group of first optical-path deflectors 21c causes light incident thereon to spread within a plane parallel to the emission surface 12; the plurality of prisms P21c causes the light having an intensity distribution according to the images of the lines 31c1, 31c2 to exit from the emission surface 12. Hereby, light from the plurality of prisms P21c belonging to the group of first optical-path deflectors 21c and arranged along the x axis direction is the light that forms the image of the lines 31c1, 31c2. The lines 31c1, 31c2 are substantially within a plane parallel to the xy plane, and form a portion of the stereoscopic image I.

Here, the lines 31c1, 31c2, lines 31b1, 31b2, 31b3, and lines 31a1, 31a2 are formed at different locations along the z axis direction in the stereoscopic image forming plane 30.

The lines 31c1, 31c2, lines 31b1, 31b2, 31b3, and lines 31a1, 31a2 are formed at different locations along the z axis direction in the stereoscopic image forming plane 30, and are each perceived as separated in FIG. 3 as previously described. However, in reality, the groups of first optical-path deflectors 21a, 21b, 21c, may be made up of more groups of first optical-path deflectors 21a, 21b, 21c, . . . with a smaller gap between the groups of first optical-path deflectors 21a, 21b, 21c, . . . in they axis direction. Alternatively, the optical-path deflection angle may be selected for each of the prisms P21a, P21b, P21c so that even if the groups of first optical-path deflectors 21a, 21b, 21c, . . . are separated along the y axis direction, the lines 31a1, 21a2, lines 31b1, 31b2, 31b3, and lines 31c1, 31c2 are formed at locations that are closer to each other along the z axis direction. Therefore, a planar image FI of a circle with diagonal line can be perceived as a stereoscopic image I as illustrated in FIG. 5.

Thus, the optical device 1A groups light beams from each plurality of prisms P21a, P21b, P21c in the groups of first optical-path deflectors 21a, 21b, 21c, . . . which are arranged two-dimensionally; hereby, the optical device 1A use the light beams to form a planar image FI that is presented in a space near an observer. Therefore, an observer is able to recognize a stereoscopic image I constituted from a planar image FI over a wide range of positions along the y axis direction.

Shape of the First Optical-Path Deflectors for Forming the Planar Image

Figure 6:
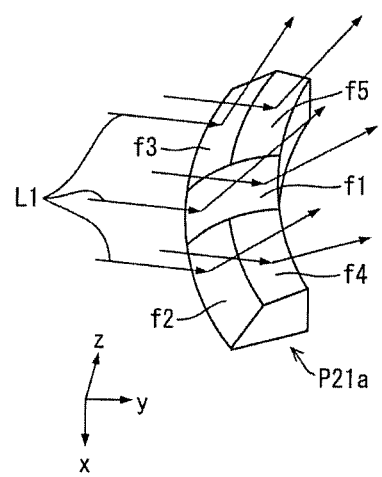
FIG. 6 is a perspective view of one example of configuring prisms in a light guide plate in the optical device for forming the planar image.
Figure 7A:
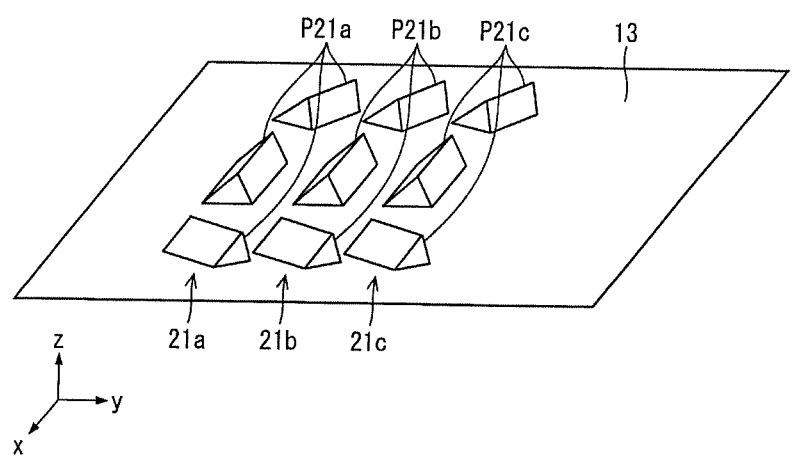
FIG. 7A is a perspective view illustrating an example of arranging the prisms in the light guide plate in the optical device.
Figure 7B:
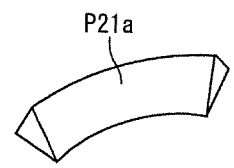
FIGS. 7B, 7C, and 7D are perspective views of modifications to the configuration of the prisms.
Figure 7C:
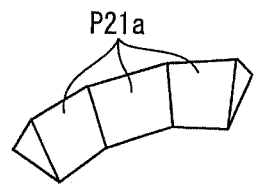
Figure 7D:
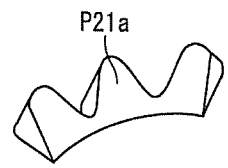
Figure 8A:
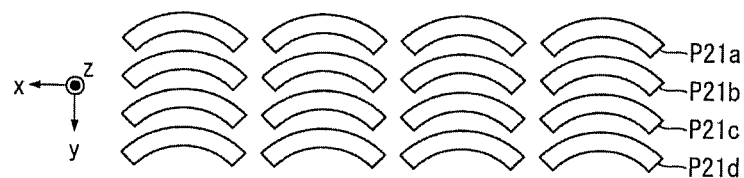
FIGS. 8A, 8B, and 8C are plan views schematically illustrating examples of arranging prisms in the light guide plate in the optical device for forming the planar image.
Figure 8B:
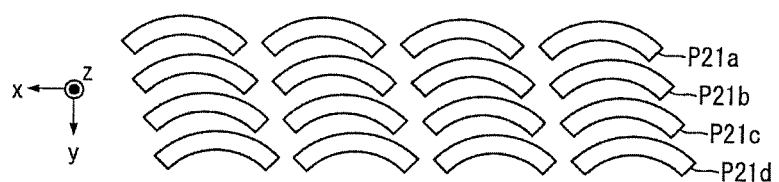
Figure 8C:
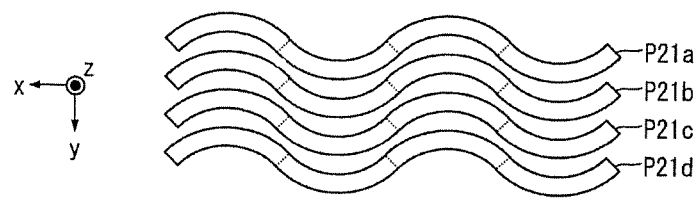

The shape of the prisms P21a, P21b, P21c in the groups of first optical-path deflectors 21a, 21b, 21c, . . . for forming the planar image FI is described on the basis of FIG. 6 through FIG. 8. FIG. 6 is a perspective view of one example of configuring prisms P21a in the light guide plate 10 in the optical device 1A for forming the planar image; FIG. 7A is a perspective view illustrating an example of arranging the prisms P21a in the light guide plate 10 in the optical device 1A; FIGS. 7B, 7C, and 7D are perspective views of modifications to the configuration of the prisms P21a; and FIGS. 8A, 8B, and 8C are plan views illustrating examples of prisms P21a-P21d in the light guide plate 10 in the optical device 1A for forming the planar image.

As illustrated in FIG. 6, the prisms P21a in the group of first optical-path deflectors 21a may have a truncated mountain cross-section and include, for example, reflection surfaces f1, f2, f3, f4, f5. The reflection surfaces f1, f2, f3, f4, f5 are one example of optical surfaces that function as deflection surfaces, changing the optical path of light; the reflection surfaces f1, f2, f3, f4, f5 are curves oriented in mutually different directions. As above described, the optical axis of the light emitting diodes (LED 2a) in the first embodiment is inclined within the yz plane at no more than an angle θ with the emission surface 12 of the light guide plate 10. Therefore, even if the light entering the light guide plate 10 is almost parallel light it is possible to increase the amount of light that repeatedly reflects between the emission surface 12 and the rear surface 13 and is directed through the light guide plate 10 compared to when the optical axis of incident light is parallel to the y axis. Accordingly, it is possible to increase the amount of light incident on the reflection surfaces f1, f2, f3, f4, f5 compared to when the optical axis of the incident light is parallel to the y axis.

The aforementioned reflection surface f1 is an arced, upwardly sloping, inclined surface that is curved in a direction parallel to light L1 guided by the light guide plate 10; the light L1 incident on the reflection surface f1 exits from the emission surface 12 at a different emission angle depending on the location the light L1 is incident on the reflection surface f1. As a result, the reflection surface f1 increases the range of the light L1 incident thereon along, for instance an area 31 of the stereoscopic image I, as illustrated in FIG. 2. In the first embodiment the area 31 is an area parallel to the y axis. The light reflecting from the reflection surface f1 is oriented from the reflection surface f1 toward where the area 31 exists, and essentially no light reflected from the reflection surface f1 travels toward where the area 31 does not exist. Accordingly, the light reflected from the reflection surface f1 is substantially distributed from the reflection surface f1 to only angles within the yz plane toward the area 31. Thus, the reflection surface f1 modulates the intensity of light incident thereon in the yz plane in an angular direction and outputs said light. Because the reflection surface f1 is curved, the reflection surface f1 is able to provide the light that draws the lines in the image, even if the light L1 which is incident on the reflection surface f1 is parallel light.

As illustrated in FIG. 6, the reflection surfaces f2, f3 in the prisms P21a are donut-like with a truncated mountain cross section; the reflection surfaces f2, f3 sandwich the reflection surface f1 and extend along the arc thereof. Each of the reflection surfaces f2, f3 are slanted surfaces that incline upwardly to a point, similarly to the reflection surface f1. As a result, the light L1 incident on the reflection surfaces f2, f3 is reflected therefrom, and the reflection surfaces 12, f3 widens the range of the reflected light along the line 31a1 and the line 31a2 in the stereoscopic image I as illustrated in FIG. 3. Further, the reflection surface f1 ensures there are no lines between the line 31a1 and the line 31a2 in the stereoscopic image I as illustrated in FIG.

As illustrated in FIG. 6, the reflection surfaces f4, f5 are created from rising slanted surfaces formed passing through an inflection line partway along the reflection surfaces f4, f5. The presence of the reflection surfaces f4, f5 allow the line 31c1 and the line 31c2 to be created in the stereoscopic image I as illustrated in FIG. 3.

Thus, for example, through the shape of the reflection surfaces f1, 12, f3, f4, f5, the prisms P21a can create the lines 31, i.e., lines 31a1, 31a2, 31b1, 31b2, 31b3, 31c1, 31c2 which are the base for creating the planar image FI in the stereoscopic image I.

The prisms P21a are depicted in FIG. 6 as a single prism that forms all the lines, i.e., lines 31a1, 31a2, 31b1, 31b2, 31b3, 31c1, 31c2 in the planar image FI. However, it tends to be more difficult to use a single prism to form all the shapes in the actual planar image FI.

Thus, for example, groups of first optical-path deflectors 21a, 21b, 21c, . . . may be provided from a plurality of prisms P21a, . . . , prisms P21b, . . . , and prisms P21c, . . . , as illustrated in FIG. 7A.

The prisms P21a, 21b, 21c illustrated in FIG. 7A may be tetrahedral prisms arranged horizontally. However, the prisms are not limited to these shapes, and may be, for example arced tetrahedrons, arced tetrahedrons with an inflected section, or a partially corrugated arced tetrahedrons as illustrated in FIGS. 7B, 7C, 7D.

The plurality of prisms P21a . . . , prisms P21b . . . , prisms 21c . . . illustrated in FIG. 7A may be distributed in rows along the y axis direction as illustrated in FIG. 8A. However, the prisms P21a . . . , prisms 21b . . . , prisms P21c . . . , and prisms 21d . . . are not limited to this kind of arrangement and may be distributed so that when viewed in order along the y axis direction, the prisms P21a . . . , prisms 21b . . . , and prisms 21c . . . , and prisms 21d . . . appear shifted by a fixed amount along the x axis direction (FIG. 8B). The prisms P21a, prisms 21b, prisms P21c, and prisms 21d may also be arcs that are arranged to appear as a wave (FIG. 8C).

Example of Modifying the Shapes of the First Optical-Path Deflectors for Forming the Planar Image To describe the shapes of the groups of first optical-path deflectors 21a, 21b, 21c, . . . used to form the planar image FI, the previous section describes the shapes of the prisms P21a, 21b, 21c that form the lines 31a1, 31a2, lines 31b1, 31b2, 31b3, and lines 31c1, 31c2 which are the basis of the planar image FI. However, the groups of first optical-path deflectors 21a, 21b, 21c, . . . used to form the planar image FI are not limited to these shapes. For instance, a prism P22 may be formed that matches the shape of the planar image FI. Providing a plurality of the prisms P22 makes it possible for a group of third optical-path deflectors 22 to serve as a group of planar-image optical-path deflectors 21 that form the planar image FI.

Figure 9:
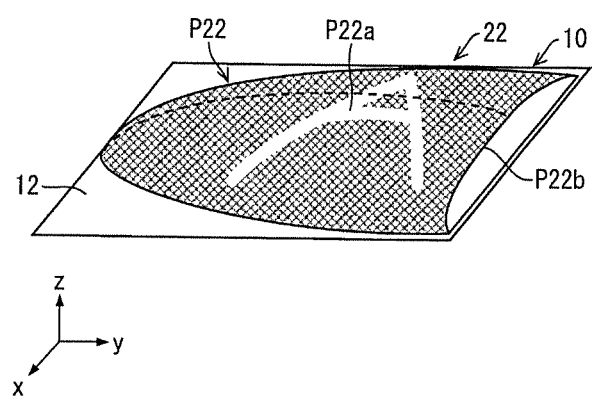
FIG. 9 is another example of modifying the prisms in the light guide plate in the optical device for forming the planar image and is a perspective view of the shapes of the prisms when the prisms form planar images as parallax images.

The shape of the prism P22, which represents a case where the shape of the prism forms the planar image FI without change, is described on the basis of FIG. 9. FIG. 9 is a perspective view illustrating the shape of a prism P22 that forms the planar image FI as a parallax image.

The prism P22 is a convex reflection surface and is formed on the rear surface 13 of the light guide plate 10 as illustrated in FIG. 9. The convex reflection surface of the prism P22 is configured to change the optical path of light directed thereto in the light guide plate 10, and cause the light to exit from the emission surface 12 as light beams that pass through the stereoscopic image forming plane 30.

For example, the outer convex surface of the prism P22 is provided with a lettering portion P22a whereon a character "A" is formed, and outside the lettering portion P22a is an anti-reflective film portion P22b. Light entering the anti-reflective film portion P22b is does not reflect therefrom.

In contrast, the light entering the lettering portion P22a (e.g., for the letter 'A'), reflects therefrom. Thus, the prism P22 changes the optical path of light entering therein, and causes the light to exit from the emission surface 12 as light beams that pass through a stereoscopic image I of the letter A.

The anti-reflective film portion P22b may be created by coating the rear surface 13 of the light guide plate 10 except for the lettering portion P22a (e.g., for the letter 'A'), with black paint. The anti-reflective film portion P22b (e.g., for the letter 'A'), may also be created by printing with black paint and leaving out the lettering portion P22a.

Thus, given that the lettering portion P22a may be created by printing the black paint material after forming the convex portions on the rear surface 13 of the light guide plate 10, this simplifies the process of producing the prism P22.

For instance, creating a lettering portion P22a on the prism P22 (e.g., for the letter 'A'), in such a manner makes it possible to form a stereoscopic image I made up of a planar image FI using the parallax image technique proposed in Japanese Patent Publication No. 2012-118378.

Forming a Line Image

The optical device 1A of the first embodiment may also form a line image LI in space that constitutes the stereoscopic image I. In this case, the optical-path deflectors 20 are made up of groups of second optical-path deflectors 25 that form a line image LI.

Figure 10:
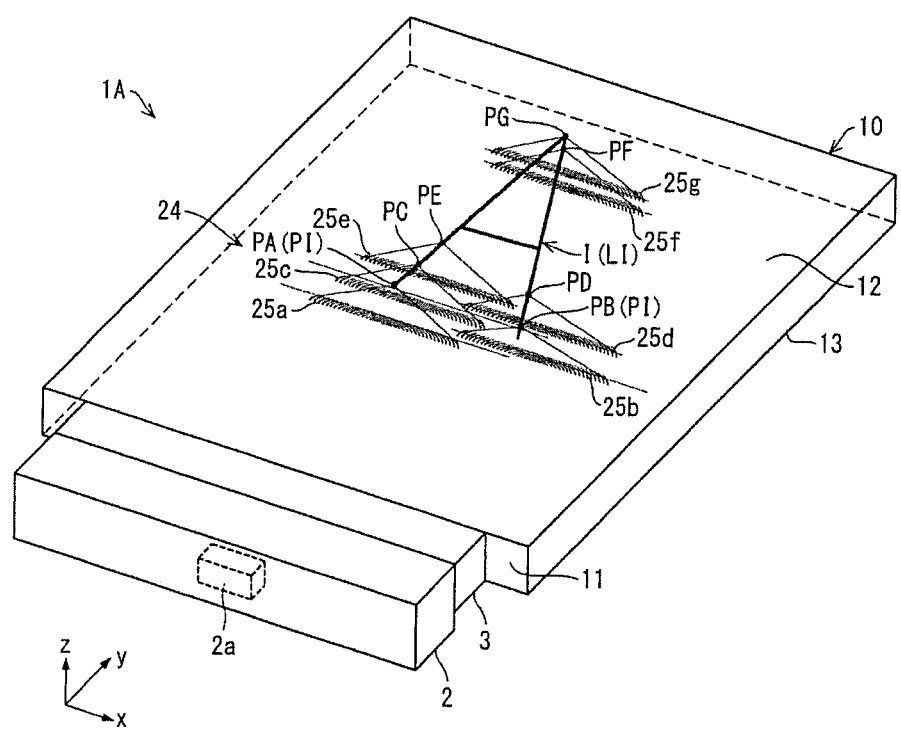
FIG. 10 is a perspective view illustrating a configuration of groups of second optical path deflectors in the optical device that form line images.

A configuration of the groups of second optical-path deflectors 25 that form the line image LI is described below on the basis of FIG. 10. FIG. 10 is a perspective view illustrating a configuration of groups of second optical-path deflectors 25 that form a line image LI.

Assume that a line images LI of the letter "A" is formed as the stereoscopic image I in a space as illustrated in FIG. 10.

In this case, light from the light source 2 enters the light guide plate 10, and a plurality of groups of outline-image optical-path deflectors 24 are formed on the rear surface 13 of the light guide plate 10 in the optical device 1A in the first embodiment; the group of outline-image optical-path deflectors 24 are constituted by groups of second optical-path deflectors 25a, 25b, 25c, 25d, 25e, 25f, 25g. Note that the light source 2 may be configured from a single light emitting diode (LED 2a); additionally, the light source 2 may be mounted facing the end surface opposite the incidence surface 11 of the light guide plate 10. That is, a light source 2 may be provided at the incidence surface 11 of the light guide plate 10 for forming the planar image FI, and another light source 2 may be provided at the end surface opposing the incidence surface 11 for forming the line image LI.

Portions of groups of second optical-path deflectors 25a-25g for forming the line image LI are formed from a Fresnel lens. The groups of second optical-path deflectors 25a-25g are formed continuously for the most part along the x axis direction.

There may be gaps provided between the plurality of refraction surfaces (prism surfaces) that function as the Fresnel lens in the groups of second optical-path deflectors 25a-25g. The light guide plate 10 guides light toward each location of a group of second optical-path deflectors 25a-25g along the x axis direction. The groups of second optical-path deflectors 25a-25g causes light incident thereon at the locations of the groups of second optical-path deflectors 25a-25g to substantially converge at a fixed point corresponding to each group of second optical-path deflectors 25a-25g. FIG. 10 illustrates the convergence of a plurality of light rays from the groups of second optical-path deflectors 25a-25g.

More specifically, the group of second optical-path deflectors 25a corresponds to a point image PI of a fixed point PA in the stereoscopic image I. The light rays from each position in the group of second optical-path deflectors 25a converge at the fixed point PA in the stereoscopic image I. Therefore, the optical wavefront from the group of second optical-path deflectors 25a appears as an optical wavefront that is radiating from the fixed point PA.

Next, the group of second optical-path deflectors 25*b* corresponds to a point image PI of a fixed point PB in the stereoscopic image I. The light rays from each position in the group of second optical-path deflectors 25*b* converge at the fixed point PB in the stereoscopic image I. Thus, the light rays from the locations of any desired groups of second optical-path deflectors 25*a*-25*g* converge at a fixed point corresponding to the groups of second optical-path deflectors 25*a*-25*g*. Hereby, any of the groups of second optical-path deflectors 25*a*-25*g* may present an optical wavefront that appears to radiate from a corresponding fixed point. The point images PI of the fixed points PA-PG corresponding to the groups of second optical-path deflectors 25*a*-25*g* are mutually different; additionally, grouping the plurality of fixed points PA-PG corresponding to the groups of second optical-path deflectors 25*a*-25*g* form the stereoscopic image I in a space. In this manner, the optical device 1A projects a stereoscopic image I in a space.

That is, the groups of second optical-path deflectors 25*a*-25*g* are formed closely along the y axis direction in the optical device 1A in the first embodiment. As a result, the grouping of the plurality of fixed points PA-PG are perceived by the human eye as substantially a line image LI in the stereoscopic image I.

Here, the light beams guided by the light guide plate 10 and passing through the locations in the light guide plate 10 in the xy plane have a spread angle about the direction connecting each location in the light guide plate and the light source 2 that is smaller than a predetermined value. Additionally, within a plane orthogonal to the xy plane and including a line connecting each location in the light guide plate 10 and the light source 10, the light beams guided by the light guide plate 10 and passing through the locations in the light guide plate 10 have a spread angle about the direction connecting each location in the light guide plate and the light source 2 that is smaller than a predetermined value. The groups of second optical-path deflectors 25*a*-25*g* may be provided at a location away from the light source 2; in this case, the light beams guided by the light guide plate 10 and incident on the groups of second optical-path deflectors 25*a*-25*g* do not spread within the xy plane generally about the y-axis direction. Therefore, light from the groups of second optical-path deflectors 25*a* converge substantially on a single fixed point in a plane that includes the fixed point PA and is parallel to the xz plane.

If the light incident on the groups of second optical-path deflectors 25*a*-25*g* spreads in the z direction, light from the groups of second optical-path deflectors 25*a*-25*g* converges along the y axis on a line in space that includes the fixed point as is later described. What is discussed here is the spread of light within the xy plane from the light incident on the groups of second optical-path deflectors 25*a*-25*g* and the convergence of light from the groups of second optical-path deflectors 25*a*-25*g* in the xy plane in particular; therefore, these concepts are presented as light from the groups of second optical-path deflectors 25*a*-25*g* converging on a fixed point.

As illustrated in FIG. 10, the group of second optical-path deflectors 25*a* is formed along a line. The group of second optical-path deflectors 25*b* is also formed along a line. The groups of second optical-path deflectors 25*a*, 25*b* are each formed on a straight line parallel to the x axis. Any of the groups of second optical-path deflectors 25*a*-25*g* are formed continuously for the most part along a straight line parallel to the x axis. Therefore, the groups of second optical-path deflectors 25*a*-25*g* are each formed with the length thereof perpendicular to the light guiding direction of the light guide plate 10 in a plane parallel to the emission surface 12.

Thus, the groups of second optical-path deflectors 25*a*-25*g* are each formed along a predetermined line within a plane parallel to the emission surface 12. Light guided by the light guide plate 10 is incident on each of the groups of second optical-path deflectors 25*a*-25*g*, and the groups of second optical-path deflectors 25*a*-25*g* cause emission light to exit from the emission surface 12 toward a direction substantially converging onto a single convergence point in a space. Note that when the fixed point is near the rear surface 13 of the light guide plate 13, the emission light radiates from the fixed point. Therefore, when the fixed point is near the rear surface 13 of the light guide plate 10, the reflection surfaces in the groups of second optical-path deflectors 25*a*-25*g* cause emission light to exit from the emission surface 12 in a direction so that the light radiates, for the most part, from a single convergence point in a space.

Shape of the Second Optical-Path Deflectors for Forming the Line Image

Figure 11A:
FIG. 11A is a plan view illustrating a configuration of a group of second optical path deflectors in the optical device that form a line image; and 11B is a plan view illustrating an example of modifying the configuration of the group of second optical path deflectors in the optical device that forms a line image.
Figure 11B:
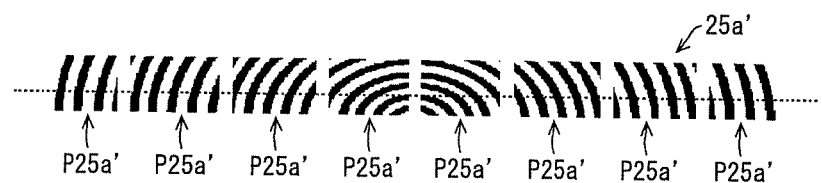
Figure 12A:
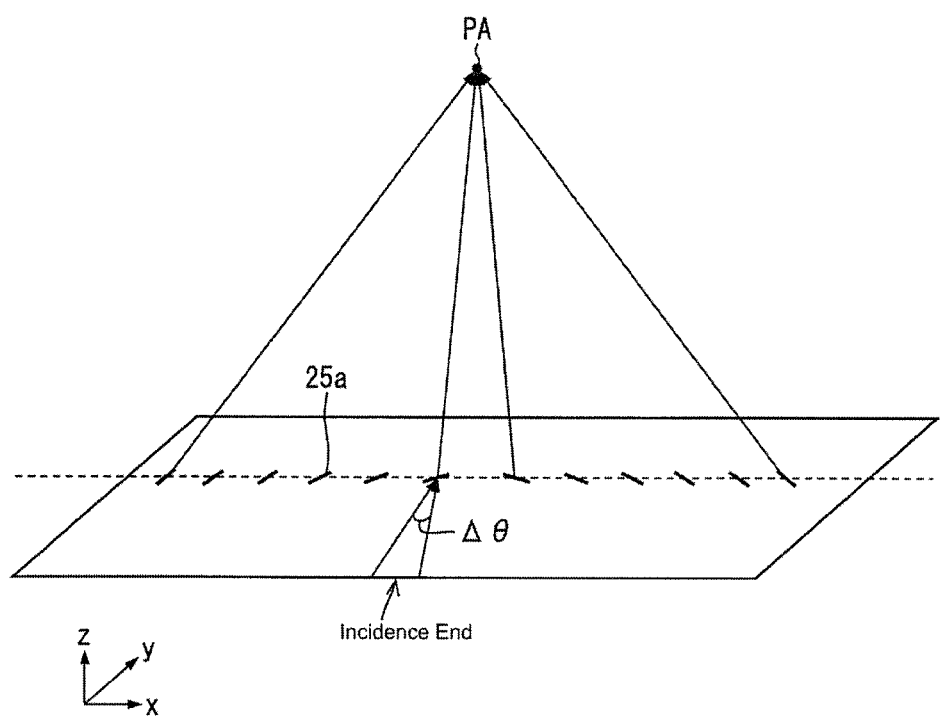
FIG. 12A is a perspective view illustrating a configuration of a group of second optical path deflectors in the optical device that form a point image; and 12B is a perspective view illustrating a configuration of the group of second optical path deflectors forming a point image along with a two-dimensional image.
Figure 12B:
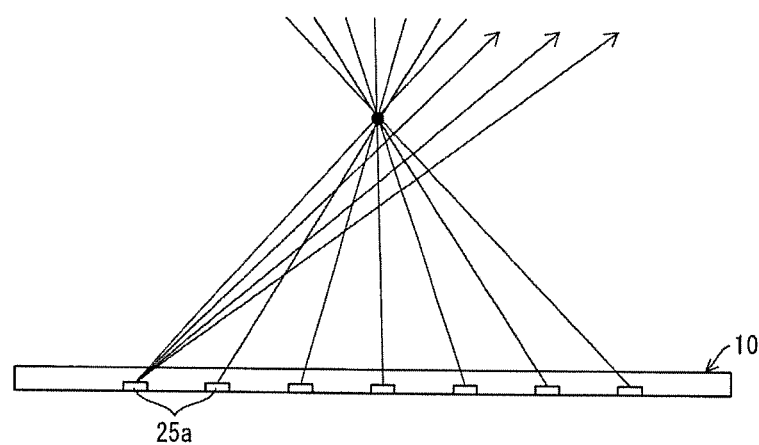

The groups of second optical-path deflectors 25*a*, 25*b*, 25*c*, 25*d*, 25*e*, 25*f*, 25*g* in the optical device 1A of the first embodiment are for forming a line image LI; the groups of second optical-path deflectors 25*a*, 25*b*, 25*c*, 25*d*, 25*e*, 25*f*, 25*g* are described on the basis of FIG. 11A, 11B, FIGS. 12A and 12B. FIG. 11A is a plan view illustrating a configuration of a group of second optical path deflectors 25*a* in the optical device 1A for forming a line image LI; and FIG. 11B is a plan view illustrating an example of modifying the group of second optical path deflectors 25*a* in the optical device 1A for forming a line image LI. FIG. 12A is a perspective view illustrating the focusing of light from the group of second optical-path deflectors 25*a* shown in FIG. 11A; and FIG. 12B is a perspective view illustrating a configuration of groups of second optical-path deflectors that form point images and a two-dimensional image.

As illustrated in FIG. 11A, each of the deflectors in the group of second optical-path deflectors 25*a* may form an image from a portion of a Fresnel lens. This portion of Fresnel lens may be concentric circles cut into bands. The group of second optical-path deflectors 25*a* thus configured is such that the radius of the center is greater than the radius at the ends for each of the deflectors in the group. Therefore, light entering the center of the group of second optical-path deflectors 25*a* converges at the fixed point PA directly above the center (FIG. 12A); further, light entering at the ends of the group of second optical-path deflectors 25*a* are largely refracted to converge at the fixed point directly above the center. Thus, the group of second optical-path deflectors 25*a* in the first embodiment is configured so that all the prisms cause light to converge on the fixed point PA because prisms of different orientations are on a straight line. A large amount of light converges on the fixed point PA because multiple prisms P25*a* cause light to converge thereat. Therefore, naturally, the actual line images LI produced from aligning the fixed points PA through PG are made up of a large amount of light.

Accordingly, the line images LI formed by the group of second optical-path deflectors 25*a* in the optical device 1A of the first embodiment are clear and are made up of a large amount of light. Therefore, according to one or more embodiments of the present invention, the line images LI formed from the group of second optical-path deflectors 25 in the first embodiment are used to outline the planar image FI formed by the group of first optical-path deflectors 21.

All the optical-path deflectors in the group of second optical-path deflectors 25*a* are described as causing light to converge at the fixed point PA directly above the center as seen in FIG. 12A. However, the embodiments are not limited hereto. For example, the deflectors at the ends of the group of second optical-path deflectors 25a may cause light to converge at another point as illustrated in FIG. 12B. Hereby, a group of second optical-path deflectors 25 may form the two-dimensional image 2D (later described).

As illustrated in FIG. 11A, the lenses in the group of second optical-path deflectors 25a are placed at a fixed interval. However, the lenses are not limited to this placement. For example, the lenses in the group of second optical-path deflectors 25a may be placed partly at large intervals as illustrated in FIG. 11B.

That is, a group of second optical-path deflectors 25a' may be provided with a plurality of groups of lenses 25a' along the x axis direction as illustrated in FIG. 11B.

The group of second optical-path deflectors 25a include optical surfaces that vary continuously along the length of the group of second optical-path deflectors 25a. In contrast, the group of second optical-path deflectors 25a' include optical surfaces that vary periodically along the length of the group of second optical-path deflectors 25a' similarly to the plurality of groups of lenses P25a'. Thus, light from the groups of lenses P25a' in the group of second optical-path deflectors 25a' converges on the same fixed point PA to which the group of second optical-path deflectors 25a' corresponds. The light intensity distribution of the light from the groups of lenses P25a' along the x axis direction substantially peaks at the location of the fixed point PA and decreases sharply with distance from the fixed point PA.

In contrast, when the optical surfaces of the group of second optical-path deflectors 25a are continuous in the x axis direction without separation, light from a section of the optical surfaces overlaps with a portion of light from optical surfaces surrounding that section. Therefore, the light from corresponding sections tend to have a broader intensity distribution compared to when the groups of lenses P25a' are provided with minute separations along the x axis direction. That is, the group of second optical-path deflectors 25a' may be partitioned into a plurality of groups of lenses P25a'. The width of the light intensity distribution of light from each of the groups of lenses P25a' may thus be reduced compared to when there is no separation. Thus, partitioning the group of second optical-path deflectors 25a' into a plurality of groups of lenses P25a' may result in the so-called black-matrix effect and increase the contrast of the image.

Instead of cylindrical Fresnel lens, a diffraction grating may be adopted for use as the group of second optical-path deflectors 25a and the group of second optical-path deflectors 25a'. A group of second optical-path deflectors 25a configured from prisms with reflection surfaces may serve as the group of second optical-path deflectors 25a and the group of second optical-path deflectors 25a'.

Forming a Highly Visible Image in the Space within a Wide View Direction

Figure 29A:
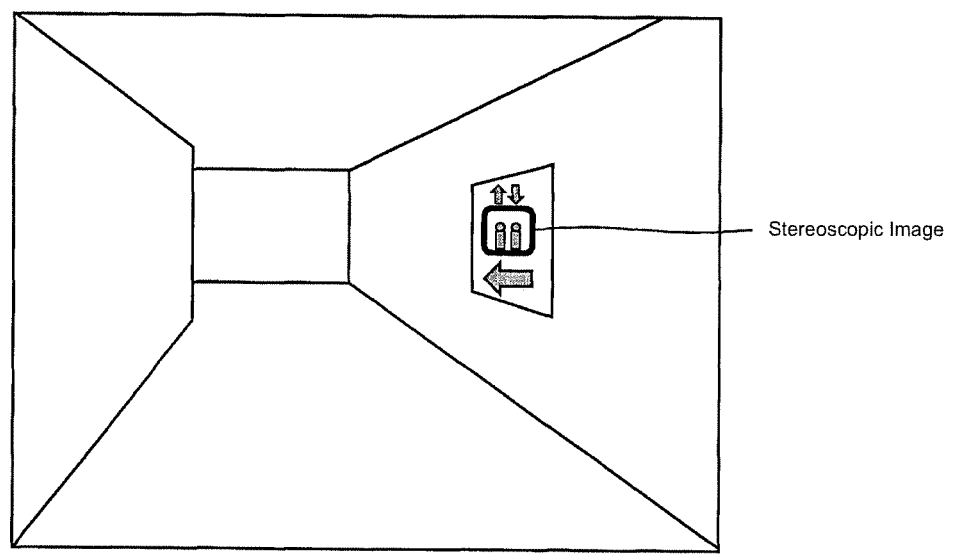
FIG. 29A is a perspective view illustrating a stereoscopic image formed emerging sideways from a wall along a corridor.
Figure 29B:
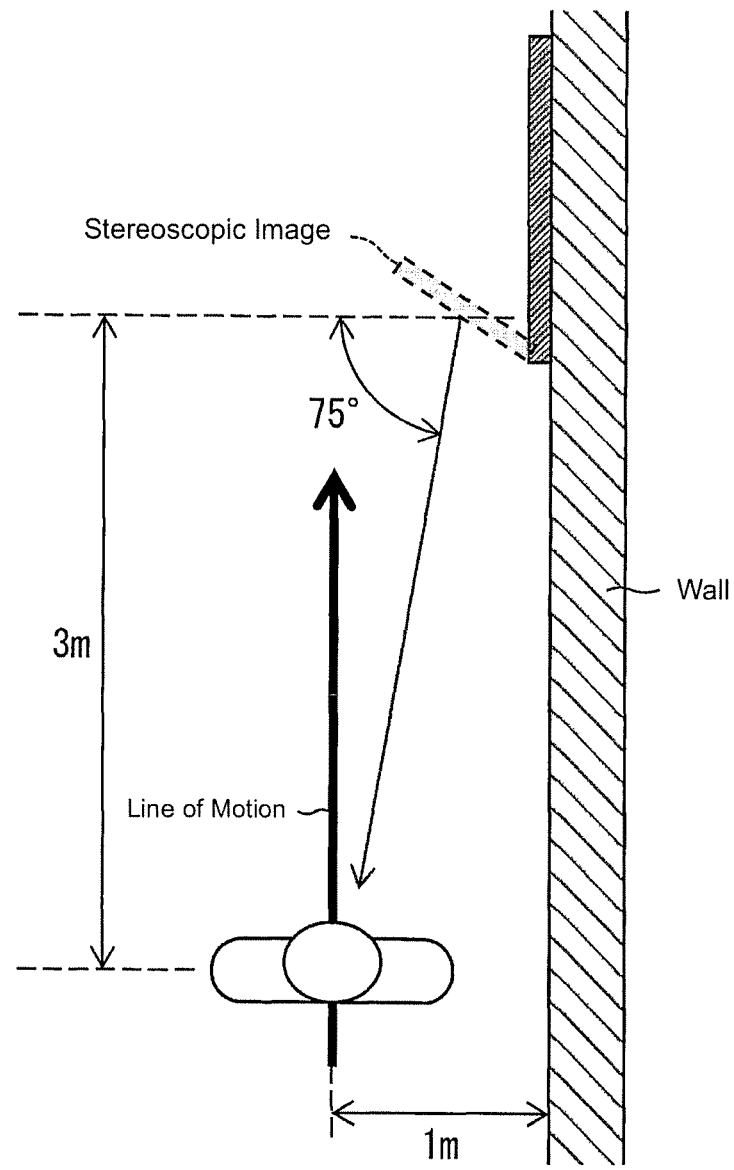
FIG. 29B is a plan view illustrating the relationship between the stereoscopic image and an observer viewing said stereoscopic image.

As previously described, consider when a stereoscopic image emerging sideways from a wall three meters (3 m) ahead along a corridor is seen by an observer one meter (1 m) away from the wall (FIG. 29A). In order for the observer to recognize that this is a stereoscopic image, the observer must view the image from at least 75° relative to the normal of the wall (FIG. 29B).

One reason is as follows.

Figure 30A:
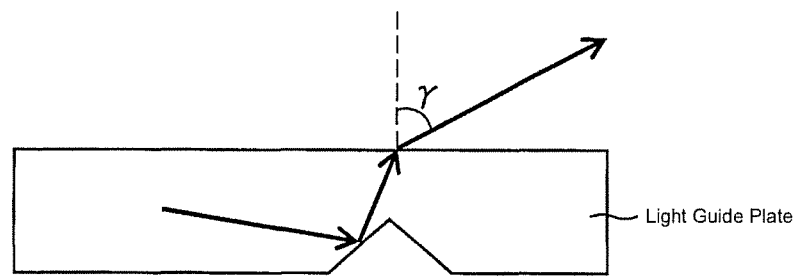
FIGS. 30A and 30B are for explaining the first reason the visibility of the stereoscopic image degrades at a wide viewing angle.
Figure 30B:
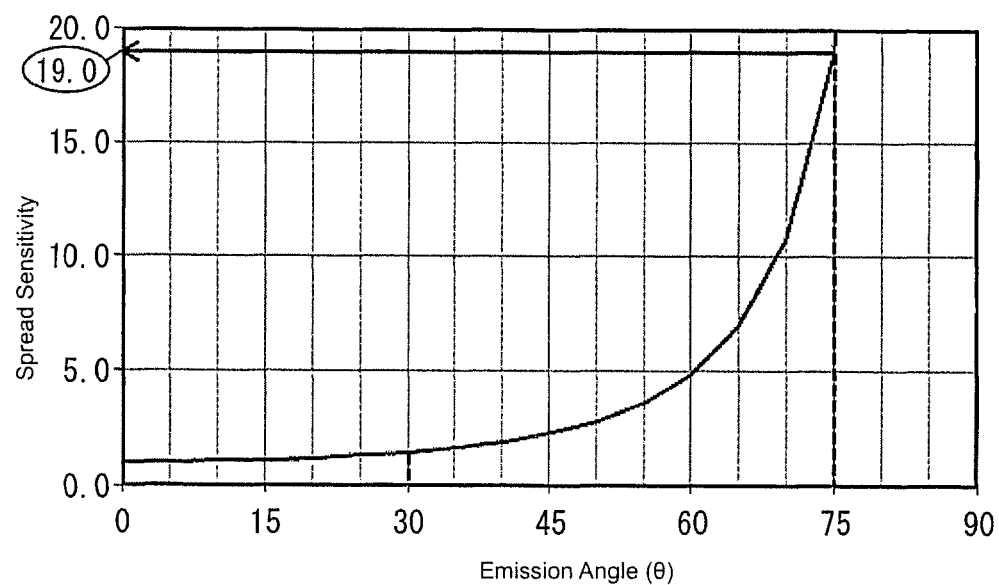
Figure 30B:
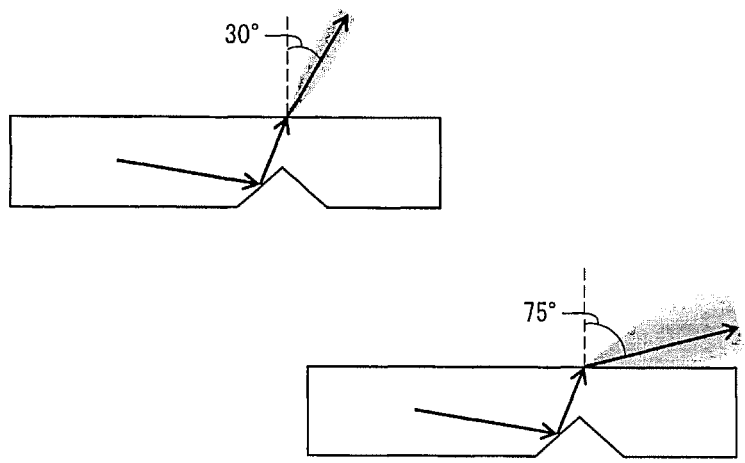
Figure 31:
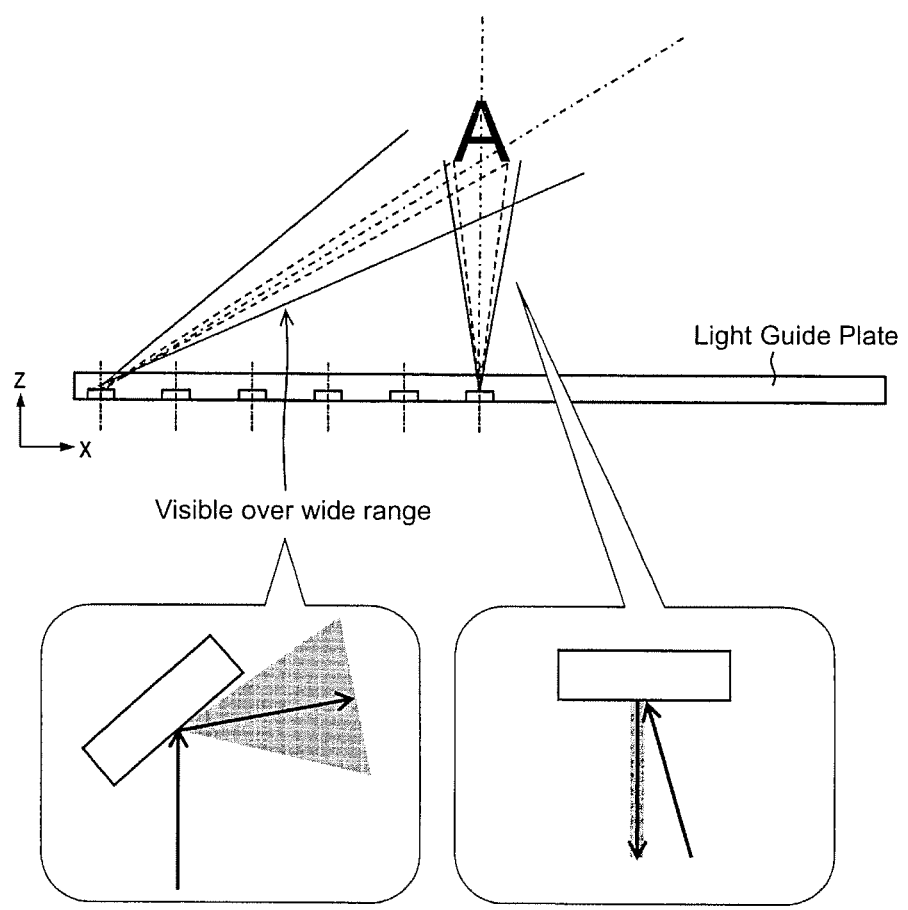
FIG. 31 explains the second reason the visibility of the stereoscopic image degrades in at wide viewing angle.

That is, consider light in the light guide plate has an emission angle γ relative to the normal of the emission surface; at am emission angle γ=30°, the spread sensitivity is roughly 1 and the shape of the stereoscopic image is less sensitive to spread (FIG. 30A and FIG. 30B). However, at the emission angle γ=75°, the spread sensitivity is roughly 19 and the shape of the stereoscopic image is more sensitive to spread. The spread sensitivity of the shape of the stereoscopic image increases drastically when the emission angle γ=60°. This is because errors in the shape largely impact blurring in the sections within a wide viewing angle where the emission angle γ is greater than or equal to 75°.

Thus, the optical device 1A according to one or more embodiments of the present invention includes a group of narrow-view optical-path deflectors 27 and a group of wide-view optical-path deflectors 28 (FIG. 1A and FIG. 1B). The group of narrow-view optical-path deflectors 27 cause the stereoscopic image I to form in a space within a narrow view direction, which is from 0° or greater to less than a first angle α relative to a reference plane BL. The group of wide-view optical-path deflectors 28 cause an image to form in a space within a wide view direction, which is greater than or equal to the first angle α and less than 90° relative to the reference plane BL. Note that the reference plane BL is orthogonal to the emission surface 12 of the light guide plate 10 and parallel to the side surface 14. The group of narrow-view optical-path deflectors 27 and the group of wide-view optical-path deflectors 28 have different image forming conditions.

More specifically, the group of narrow-view optical-path deflectors 27 form a stereoscopic image 3D as a stereoscopic image I in a space different from the light guide plate 10, i.e., above the emission surface 12 (FIG. 1A and FIG. 1B). In contrast, the group of wide-view optical-path deflectors 28 form a two-dimensional image 2D on the emission surface 12 of the light guide plate 10. The two-dimensional image 2D is formed at a fixed location on the emission surface 12 of the light guide plate 10 regardless of the angle in the wide view direction.

As a result, it is possible to ensure the stereoscopic image I is not blurry at a wide viewing angle. Thus, an optical device 1A may be provided that is capable of preventing the visibility of a stereoscopic image I from deteriorating in a space within a wide view direction.

The two-dimensional image 2D is also formed in a space within a wide view direction making it possible to present an image that is not blurry. That is, a stereoscopic image formed in a space within a wide view direction is almost no different from a two-dimensional image even if the stereoscopic image happens to be non-blurry. Therefore, there is less sense of unease when seeing a sharp two-dimensional image 2D versus seeing a blurry stereoscopic image I.

Thus, an optical device 1A may be provided that is capable of preventing the visibility of a stereoscopic image I from deteriorating in a space within a wide view direction.

Figure 13A:
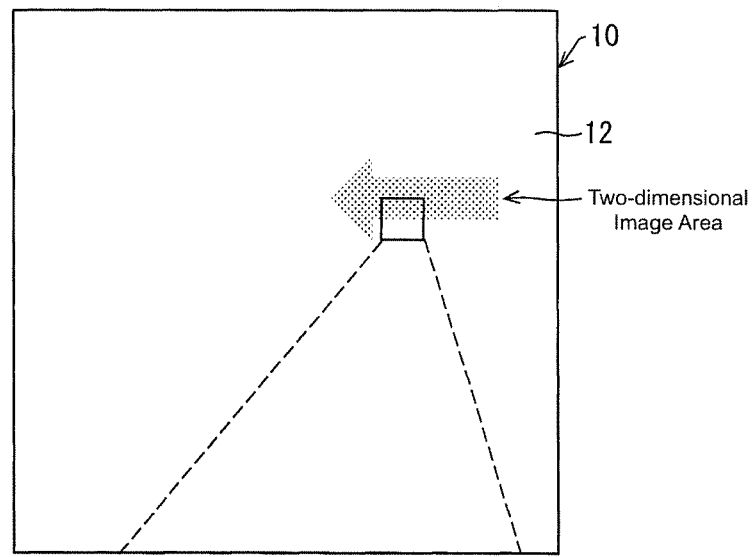
FIG. 13A illustrates an example of the shape for a group of wide-view optical-path deflectors in the optical device which form the two-dimensional image.
Figure 13B:
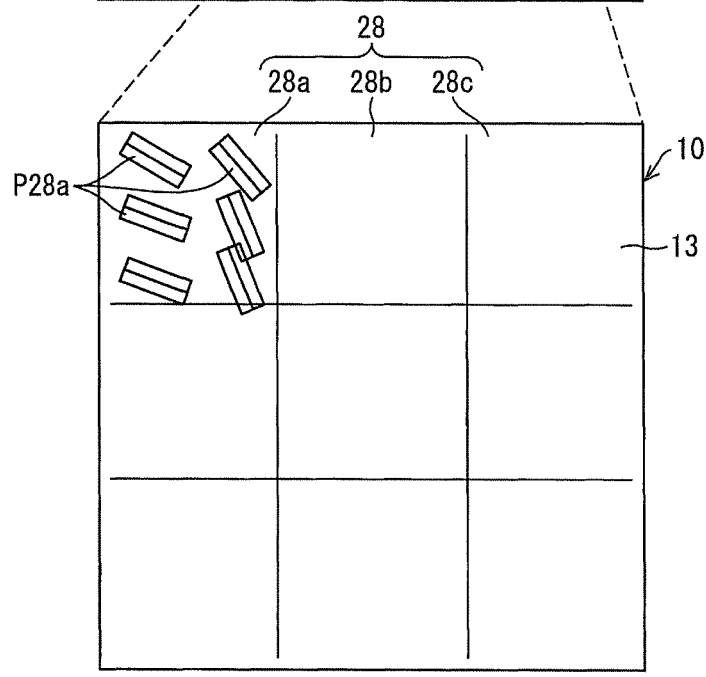
FIG. 13B is a plan view illustrating the prisms in the group of wide-view optical-path deflectors arranged in one section for creating a single dot.
Figure 13C:
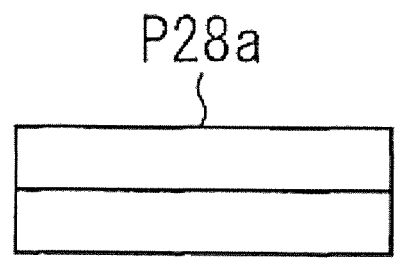
FIGS. 13C and 13D illustrate examples of shapes for a prism in the group of wide-view optical-path deflectors.
Figure 13D:
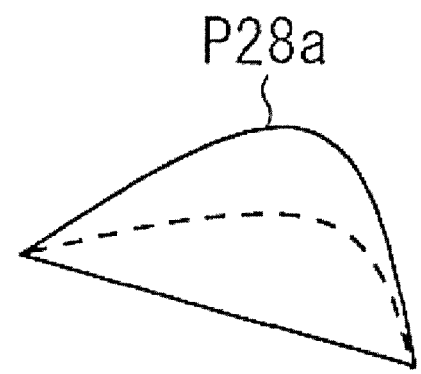
Figure 14A:
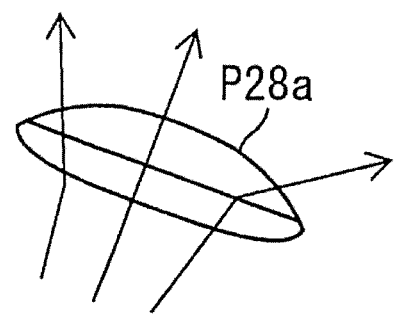
FIGS. 14A, 14B, and 14C are perspective views illustrating another example of modifying the shape of a prism in a group of wide-view optical-path deflectors in the optical device.
Figure 14B:
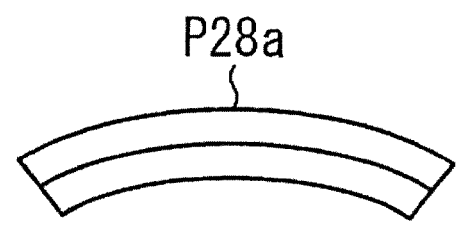
Figure 14C:
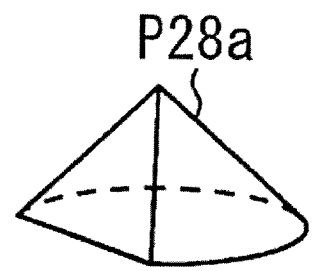

Shape of the Wide-View Optical-Path Deflectors for Forming the Two-Dimensional Image Here, the shape of the group wide-view optical-path deflectors 28 in the optical device 1A of the first embodiment is described on the basis of FIGS. 13A, 13B, 13C, 13D and FIGS. 14A, 14B, and 14C; the group of wide-view optical-path deflectors 28 forms a two-dimensional image 2D on the emission surface 12 of the light guide plate 10. FIG. 13A illustrates an example of the shape for a group of wide-view optical-path deflectors 28 that form the two-dimensional image 2D on the emission surface 12 of the light guide plate 10; FIG. 13A is a plan view illustrating the two-dimensional image 2D forming an arrow made up of a plurality of dots. FIG. 13B is a plan view illustrating the prisms in the group of wide-view optical-path deflectors 28 arranged in one section for creating a single dot; and FIGS. 13C and 13D illustrate examples of shapes for a prism in the group of wide-view optical-path deflectors 28. FIGS. 14A, 14B, and 14C are perspective views illustrating another example of modifying the shape of a prism P28a in the group of wide-view optical-path deflectors 28.

Here, when the arrow produced on the emission surface 12 of the light guide plate 10 is a two-dimensional image 2D, the two-dimensional image 2D making up the arrow is a grouping of dots (FIG. 13A). A group of fourth optical-path deflectors 28a made up of prisms P28a is provided in one section of the rear surface 13 of the light guide plate 10; this group of fourth optical-path deflectors 28a allow the light guide plate 10 to form a single dot as a point image (FIG. 13B). Further, the prisms P28a serve as the fourth optical-path deflectors making up the group of first optical-path deflectors 28a. Each of the sections provided with a group of fourth optical-path deflectors 28a, 28b, 28c, . . . constitutes a group of the wide-view optical-path deflectors 28.

The group of wide-view optical-path deflectors 28 may be configured with a group of fourth optical-path deflectors 28a, 28b, 28c, . . . in a plurality of sections; here, a group of fourth optical-path deflectors 28a, 28b, 28c, . . . in one section is made up of the prisms P28a, which serve as a plurality of fourth optical-path deflectors that forms a single point image. The group of wide-view optical-path deflectors 28 may thus be used to group the point images of a group fourth optical-path deflectors 28a, 28b, 28c, . . . from a plurality of sections. Accordingly, the two-dimensional image thus appears to present a planar image.

The group of wide-view optical-path deflectors 28 in FIG. 13B may use the tetrahedral prisms P28a illustrated in FIG. 13C. However, the embodiments are not limited hereto. For example, the prisms may be curved tetrahedrons (FIG. 13D).

The group of wide-view optical-path deflectors 28 illustrated in FIG. 13B may group the point images with high degree of directivity and present the two-dimensional image 2D. However, the embodiments are not limited hereto. For example, the group of wide-view optical-path deflectors 28 may have a low degree of directivity as illustrated in FIGS. 14A, 14B, and 14C. In this case, in order to present the two-dimensional image 2D within a fixed range, the prisms P28a may be configured where: the reflection surfaces thereof spread light (FIG. 14A); the tetrahedral prisms P28a are arced (FIG. 14B); or the prisms P28a have a shape similar to that of a truncated conical prism (FIG. 14C). Furthermore, it is also necessary in this case to ensure that the two-dimensional image 2D presented does not overlap the stereoscopic image I formed by the group of narrow-view optical-path deflectors 27.

Figure 15:
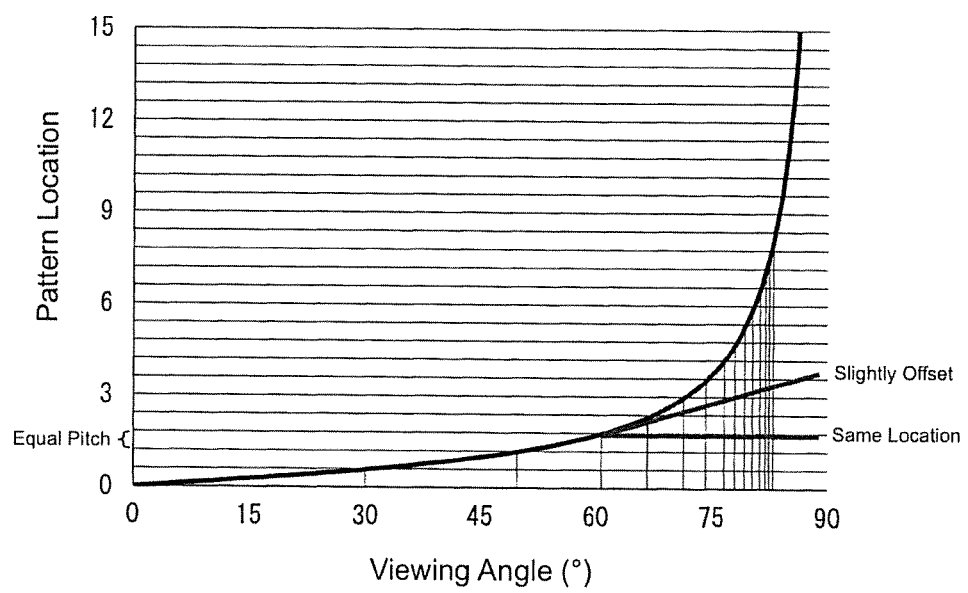
FIG. 15 is a graph showing the relationship between the viewing angle and the location at which an image is formed in the optical device.

The two-dimensional image 2D is produced at a prescribed location on the emission surface 12 of the light guide plate 10 in the optical device 1A of the first embodiment regardless of the angle in the wide view direction (i.e., the line labeled "Same Location" in FIG. 15). However, the embodiments are not limited hereto. For example, the location at which the group of wide-view optical-path deflectors 28 forms the two-dimensional image 2D may change depending on the angle in the wide view direction in the optical device 1A' (the line labeled "Slightly Offset", in FIG. 15).

Figure 16A:
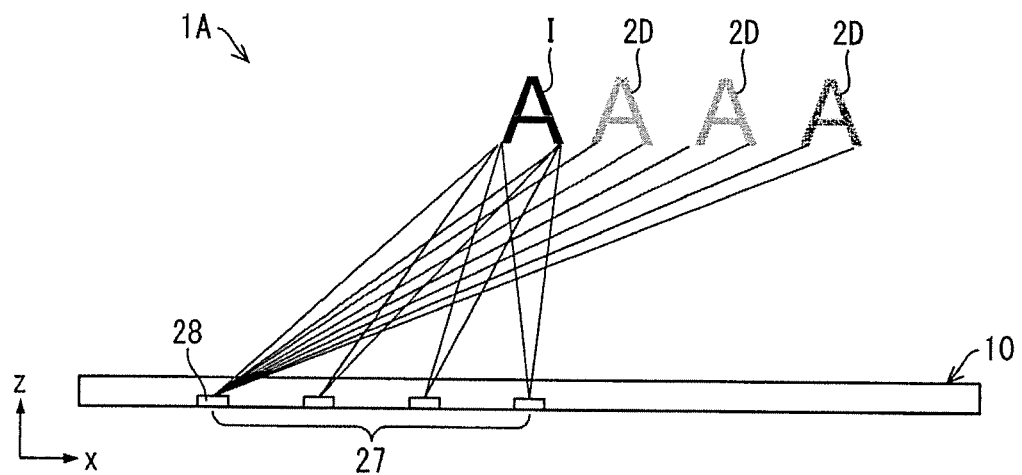
FIG. 16A is a cross-sectional view illustrating a group of narrow-view optical-path deflectors and a group of wide-view optical-path deflectors that form a stereoscopic image and a two-dimensional image respectively in a space.

That is, it is possible for the group of narrow-view optical-path deflectors 27 to form a stereoscopic image I in a space, and, for example, a group of wide-view optical-path deflectors 28 at end portions to produce two-dimensional images 2D along a wide angular direction as illustrated in FIG. 16A. As a result, an optical device 1A provided uses a group of wide-view optical-path deflectors 28 at the end portion to produce a two-dimensional image 2D in one place; hereby, the optical device 1A can form a two-dimensional image 2D at a fixed location regardless of the angle in the wide view direction.

Figure 16B:
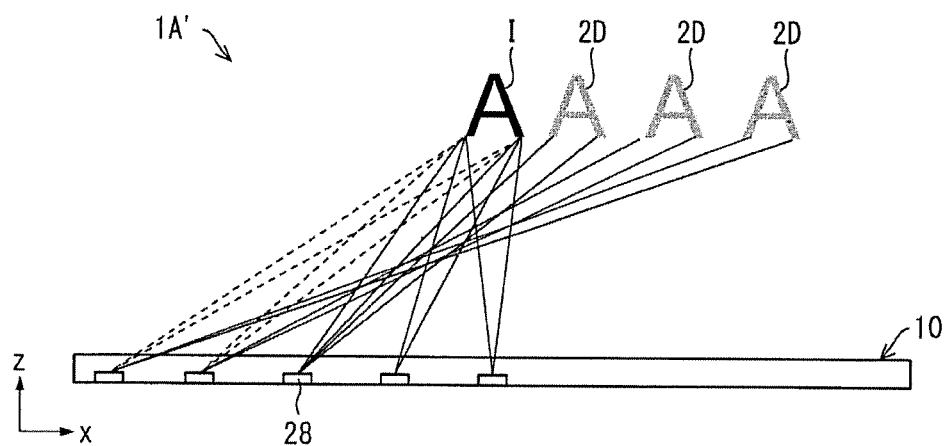
FIG. 16B is a cross-sectional view illustrating the arrangement of the group of wide-view optical-path deflectors when shifting the position of the two-dimensional image.
Figure 17:
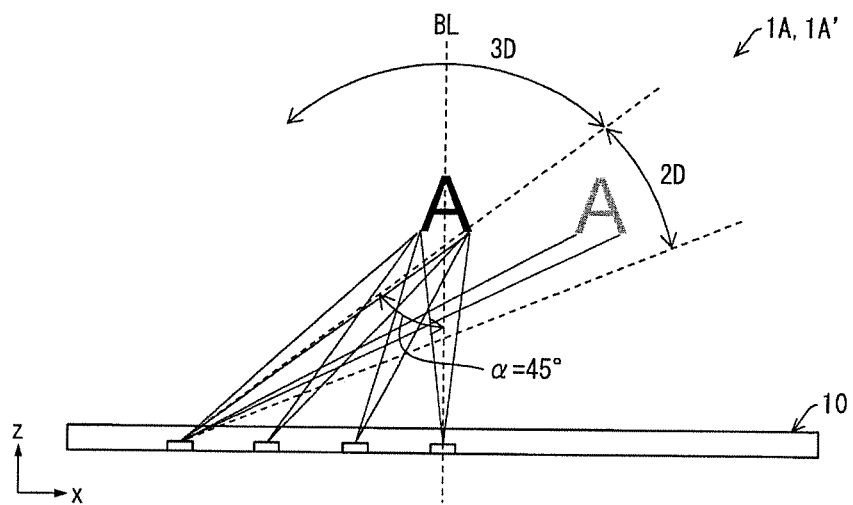
FIG. 17 is a plan view depicting a first angle the optical device.

Whereas, groups of wide-view optical-path deflectors 28 provided at different locations can form a plurality of two-dimensional images 2D as illustrated in FIG. 16B. Hereby, the optical device 1A' may be configured so that the two-dimensional image 2D appears to approach the reference plane BL when moving from a wide viewing angle toward a narrow viewing angle.

Thus, when forming the two-dimensional image 2D on the emission surface 12 of the light guide plate 10, the optical device of the first embodiment can shift where the two-dimensional image 2D is formed to a different location on the emission surface 12 of the light guide plate 10 as the viewing angle increases. As a result, it is possible to create a presentation effect where the two-dimensional image 2D moves in accordance with moving from a wide viewing angle to a narrow viewing angle and where the two-dimensional image 2D switches to a stereoscopic image I from a specific viewing angle.

Incidentally, the relationship between the viewing angle and the image forming location in the optical device 1A, 1A' yields a pattern location curve that begins to rise at or after 45° (FIG. 15). Therefore, the first angle α may be equal to 45° (FIG. 17) in the first embodiment of the optical device 1A, 1A' given the space within a wide view direction is established as greater than or equal to the first angle α and less than 90° for forming the two-dimensional image 2D. It is thus possible to ensure that the stereoscopic image is not blurry at an angle in the wide view direction established as greater than or equal to the first angle α of 45° and less than 90°. According to one or more embodiments of the present invention, the first angle α is 50°. The stereoscopic image 3D may thus be seen up to the limit where blurring becomes obvious. A first angle α of 45° creates a wide viewing angle relative to the reference plane BL and therefore means the wide viewing angle is ±45° relative to the reference plane BL in the first embodiment.

Thus, the optical device 1A of the first embodiment is equipped with a light guide plate 10 that guides light entering therein from the light source 2 and changes the optical path of the light guided thereby, causing the light to exit from the emission surface 12 and form an image in a space. The optical device 1A also includes a group of narrow-view optical-path deflectors 27 and a group of wide-view optical-path deflectors 28. The group of narrow-view optical-path deflectors 27 cause an image to form in a space within a narrow view direction, which is from 0° or greater to less than a first angle α relative to a reference plane BL. The group of wide-view optical-path deflectors 28 cause an image to form in a space within a wide view direction, which is greater than or equal to the first angle α and less than 90° relative to the reference plane BL. The reference plane BL is orthogonal to the emission surface 12 of the light guide plate 10 and parallel to the side surface 14. The group of narrow-view optical-path deflectors 27 and the group of wide-view optical-path deflectors 28 having different image forming conditions.

The group of narrow-view optical-path deflectors 27 in the optical device 1A of the first embodiment form a stereoscopic image I in a different space from the light guide plate 10. In contrast, the group of wide-view optical-path deflectors 28 form a two-dimensional image 2D on the emission surface 12 of the light guide plate 10.

Moreover, the group of wide-view optical-path deflectors 28 forms the two-dimensional image 2D at a prescribed location that does not depend on the angle in the wide view direction in the optical device 1A of the first embodiment.

Moreover, the group of wide-view optical-path deflectors 28 may form the two-dimensional image 2D at a location that changes with the angle in the wide view direction in the optical device 1A' of the first embodiment.

As a result, it is possible to ensure the stereoscopic image I is not blurry at a wide viewing angle. Thus, an optical device 1A may be provided that is capable of preventing the visibility of a stereoscopic image I from deteriorating in a space within a wide view direction.

An optical device 1A, 1A' according to the first embodiment may thus be adopted for producing a stereoscopic image I that emerges along a corridor in a lodging facility, such as a hotel, or along a narrow route such as an underground street or connecting passage; the optical device 1A, 1A' according to the first embodiment may also be used to form a stereoscopic image I to present room numbers or the like to persons using handrails, e.g., at a hospital patronized by seniors or wheelchair users.

Alternatively, as a display on a device, the stereoscopic image I may be used, for example to indicate the direction of an escalator (ascending or descending); may be made up of an arrow indicating the gates, e.g., for a train; or may be route display on a train door.

In the first embodiment of the optical device 1A, 1A, the group of narrow-view optical-path deflectors 27 and group of wide-view optical-path deflectors 28 contain a plurality of aligned groups of second optical-path deflectors 25a, 25b, 25c, . . . ; the plurality of groups of second optical-path deflectors 25a, 25b, 25c, . . . are made up of prisms P25a, P25b, P25c, . . . that act as second optical-path deflectors. The plurality of second optical-path deflectors are configured to form point images PI that appear to form a line image LI.

In other words, the optical device 1A, 1A' is equipped with a light guide plate 10 that guides light entering therein within a plane parallel to the emission surface 12, and a plurality of light focusing portions with each light focusing portion including an optical surface. Light guided by the light guide plate 10 is incident on an optical surface, and the optical surface causes the light to exit from the emission surface 12 in a direction substantially converging on a single convergence point or convergence line in a space or in direction substantially radiating from a single convergence point or convergence line in a space. Each of the plurality of light focusing portions is formed along a predetermined line within a plane parallel to the emission surface 12. The convergence point or convergence line is mutually different for each of the light focusing portions, and grouping a plurality of said convergence points or convergence lines forms an image in a space.

A point image PI of strong light intensity may thus be formed. The point images PI formed by the groups of second optical-path deflectors 25a, 25b, 25c, . . . are from a plurality of aligned the groups of second optical-path deflectors 25a, 25b, 25c, . . . . Therefore, the point images PI are aligned, appear and are thus recognizable as a line image LI.

Therefore, the groups of second optical-path deflectors 25a, 25b, 25c, . . . formed in the light guide plate 10 to function as the group of narrow-view optical-path deflectors 27 and the group of wide-view optical-path deflectors 28 tend to produce a stereoscopic image I made up of a line image LI that has strong light intensity.

In the first embodiment of the optical device 1A, 1A', the group of narrow-view optical-path deflectors 27 and group of wide-view optical-path deflectors 28 contain a plurality of aligned groups of first optical-path deflectors 21a, 21b, 21c, . . . ; the plurality of groups of first optical-path deflectors 21a, 21b, 21c, . . . , . . . are made up of prisms P21a, P21b, P21c, . . . that act as first optical-path deflectors. The plurality of first optical-path deflectors are configured to form line images LI that appear to form a planar image FI.

In other words, the optical device 1A, 1A' includes a light guide plate 10 that propagates the light from a light source 2 within a plane parallel to the emission surface 12, and a plurality of optical deflectors. The optical deflectors each deflects light propagating through the light guide plate 10 causing the light to exit from the emission surface 12 and form an image in a space. Each optical deflector spreads the light incident thereon into light with an intensity distribution corresponding to an image in a direction orthogonal to the light guiding direction of the light guide plate in a plane parallel to the emission surface 12; this causes the light to exit the emission surface 12 so that the light from the optical deflectors arranged along a direction orthogonal to the light guiding direction travels in a direction forming an image or radiating from an image. Alternatively, the optical device 1A, 1A' includes a light guide plate 10 that propagates the light from a light source 2 within a plane parallel to the emission surface 12, and a plurality of optical deflectors. The optical deflectors each deflects light propagating through the light guide plate 10 causing the light to exit from the emission surface 12 and form an image in a space. Each deflector in the plurality of deflectors spreads the light incident thereon two-dimensionally into light with an intensity distribution corresponding to an image; this causes the light to exit from the emission surface 12 so that the light from three or more deflectors arranged on different straight lines travels in a direction forming an image or radiating from the image.

Therefore, the groups of first optical-path deflectors 21a, 21b, 21c, . . . formed in the light guide plate 10 to function as the group of narrow-view optical-path deflectors 27 and the group of wide-view optical-path deflectors 28 tend to form a line image LI that is a portion of a planar image FI. Additionally, providing the plurality of aligned groups of first optical-path deflectors 21a, 21b, 21c, . . . increases the thickness of the line image LI. Therefore, the line image appears to form a two-dimensional planar image FI.

Accordingly, the groups of first optical-path deflectors 21a, 21b, 21c, . . . formed in the light guide plate 10 to function as the group of narrow-view optical-path deflectors 27 and the group of wide-view optical-path deflectors 28 tend to form a two-dimensional planar image FI.

Moreover, the group of narrow-view optical-path deflectors 27 in the first embodiment of the optical device 1A, 1A' includes a reflection surface that forms an image in a space within a narrow view direction which is taken as greater than or equal to 0° and less than the first angle $\alpha$ relative to a reference plane BL. In contrast, the group of wide-view optical-path deflectors 28 includes prisms P28a provided with a reflection surface that forms an image in a space within a wide view direction which is taken as greater than or equal to the first angle $\alpha$ and less than 90° relative to the reference plane BL.

Therefore, distinct images may be formed in a space within a narrow view direction and in a space within a wide view direction respectively from the same light source 2; this may be the case even when the group of narrow-view optical-path deflectors 27 and the group of wide-view optical-path deflectors 28 are both provided in the light guide plate 10.

Second Embodiment

A second embodiment of the present invention is described below with reference to FIG. 18A through FIG. 19. The configurations not described in the second embodiment are identical to the previously described first embodiment. For the sake of convenience, components previously described in the first embodiment that have an identical function are given the same reference numerals, and explanations therefor are omitted.

The optical device 1A of the first embodiment is configured to form the two-dimensional image 2D in a space within a wide view direction to ensure the optical device 1A provides a highly visible image in a space within a wide view direction. Whereas, the optical device 1B of the second embodiment is configured so that the group of wide-view optical-path deflectors 28 is at a greater pitch than the group of narrow-view optical-path deflectors 27.

Figure 18A:
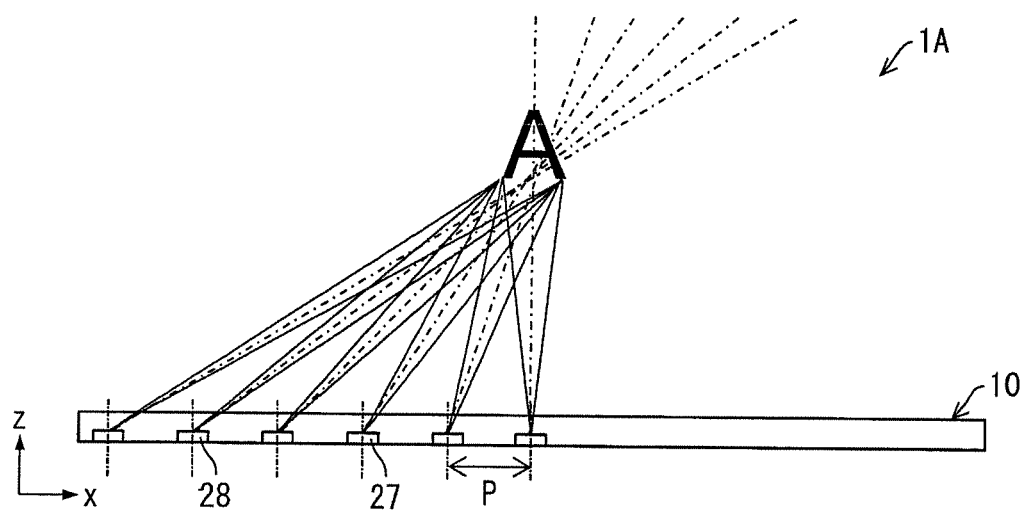
FIG. 18A is a plan view illustrating a configuration of the optical device according to the first embodiment where the group of narrow-view optical-path deflectors and the group of wide-view optical-path deflectors are arranged at the same intervals.
Figure 18B:
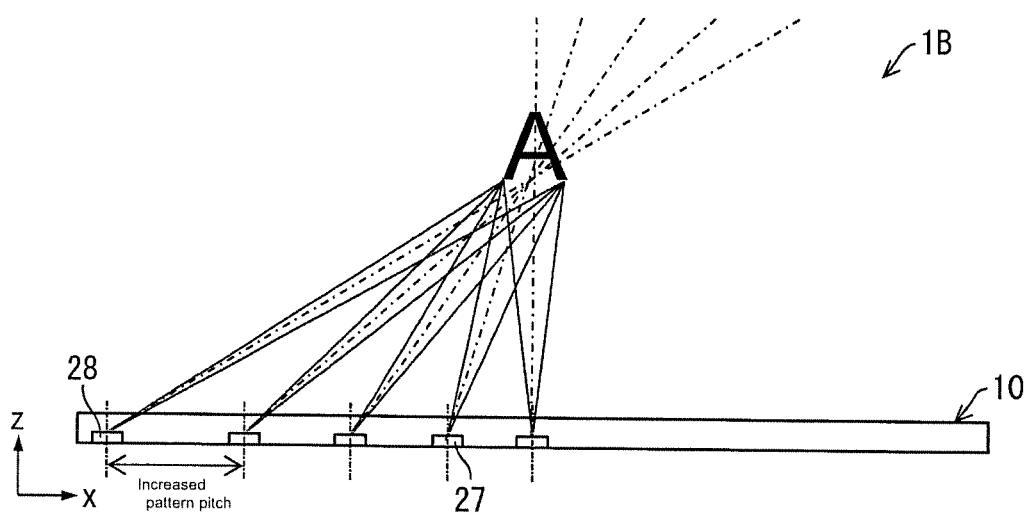
FIG. 18B illustrates an optical device according to a second embodiment of the present invention and is a plan view of a configuration of the optical device where the group of wide-view optical-path deflectors are arranged at larger intervals than the group of narrow-view optical-path deflectors.

The configuration of an optical device 1B according to the second embodiment is described on the basis of FIGS. 18A and 18B. FIG. 18A is a plan view illustrating the optical device 1A configured with the group of narrow-view optical-path deflectors 27 arranged at the same pitch p as the group of wide-view optical-path deflectors 28; and FIG. 18B is a plan view illustrating an optical device configured with the group of wide-view optical-path deflectors 27 arranged at a larger pitch p than the group of narrow-view optical-path deflectors 28.

As illustrated in FIG. 18A the stereoscopic image is formed at a short distance from the emission surface 12 of the light guide plate 10 in a space within a narrow view direction that is greater than or equal to 0° and less than the first angle α relative to the reference plane BL. Whereas, the stereoscopic image is formed at a long distance from the light guide plate via the emission surface of the light guide plate in a space within a wide view direction that is greater than or equal to the first angle α and less than 90° relative to the reference plane BL.

Here, the pitch p of the group of narrow-view optical-path deflectors 27 is the same as the pitch p of the group of wide-view optical-path deflectors 28 in the optical device 1A of the first embodiment (FIG. 18A). Therefore, the stereoscopic image in the space within a narrow view direction and the stereoscopic image in the space within a wide view direction are formed with the same resolution.

Consequently, blurring is obvious for a stereoscopic image formed in the space within a wide view direction when stereoscopic images are formed with the same resolution in the space within a wide view direction and in the space within a narrow view direction. This is because the group of wide-view optical-path deflectors 28 slants the orientation of the pattern shape used for the stereoscopic image in the space within a wide view direction.

Therefore, the optical device 1B of the second embodiment is configured so that the pitch p of the group of wide-view optical-path deflectors 28 is larger than the pitch p of the group of narrow-view optical-path deflectors 27 (FIG. 18B).

The optical device 1B of the second embodiment thus forms a stereoscopic image in the space within a wide view direction that has a lower resolution than the stereoscopic image in the space within a narrow view direction. The blurring of the stereoscopic image in the space within a wide view direction thus becomes less obvious.

Thus, an optical device 1B may be provided that is capable of preventing the visibility of a stereoscopic image from deteriorating in a space within a wide view direction.

Figure 19:
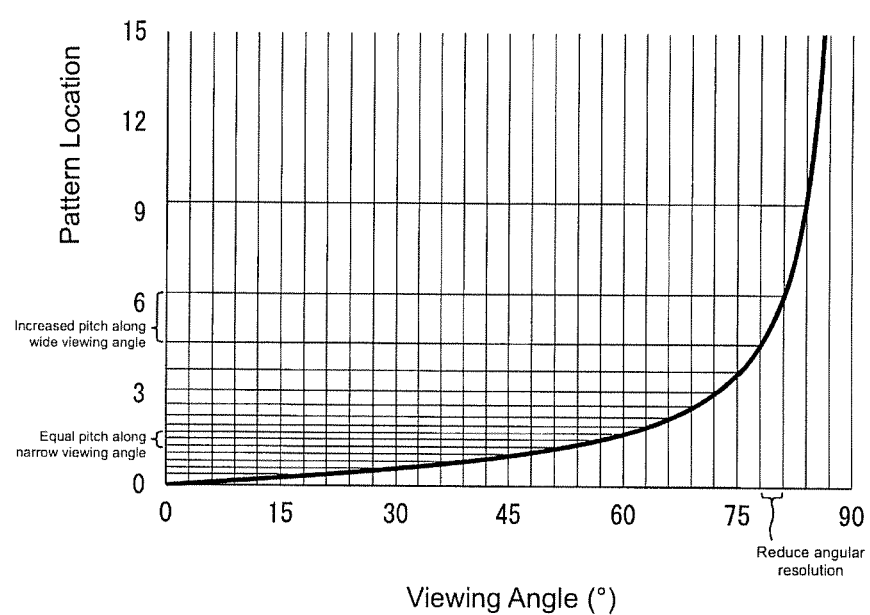
FIG. 19 is a graph showing the relationship between the viewing angle of the optical device and the pitch of the groups of wide-view optical-path deflectors and the narrow-view optical-path deflectors.

FIG. 19 is a graph showing the relationship between the viewing angle of the optical device 1B and the pitch p for the group of wide-view optical-path deflectors 28 and the group of narrow-view optical-path deflectors 27. As can be understood from the graph, the first angle α is 45° according to one or more embodiments of the present invention, and 50° according to one or more embodiments of the present invention, for the optical device 1B.

Third Embodiment

A third embodiment of the present invention is described below with reference to FIG. 20A through FIG. 22. The configurations not described in the third embodiment are identical to the previously described first and second embodiments. For the sake of convenience, components previously described in the first and second embodiments that have an identical function are given the same reference numerals, and explanations therefor are omitted.

The optical device 1C of the third embodiment is configured so that the group of narrow-view optical-path deflectors 27 and the group of wide-view optical-path deflectors 28 provide parallax images.

Figure 20A:
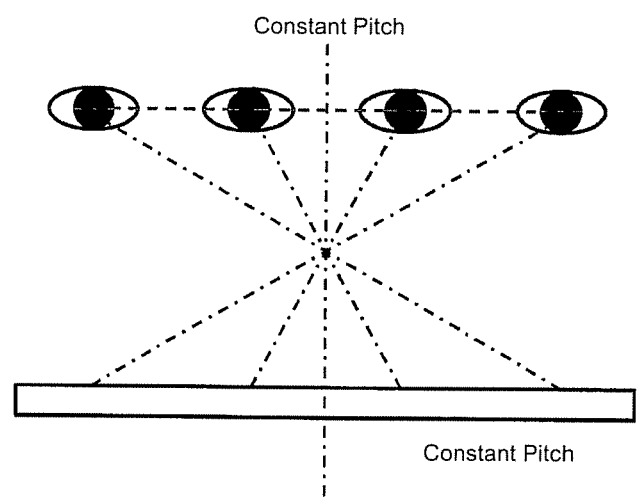
FIG. 20A is a plan view illustrating viewpoints established at equal pitch along a horizontal direction.
Figure 20B:
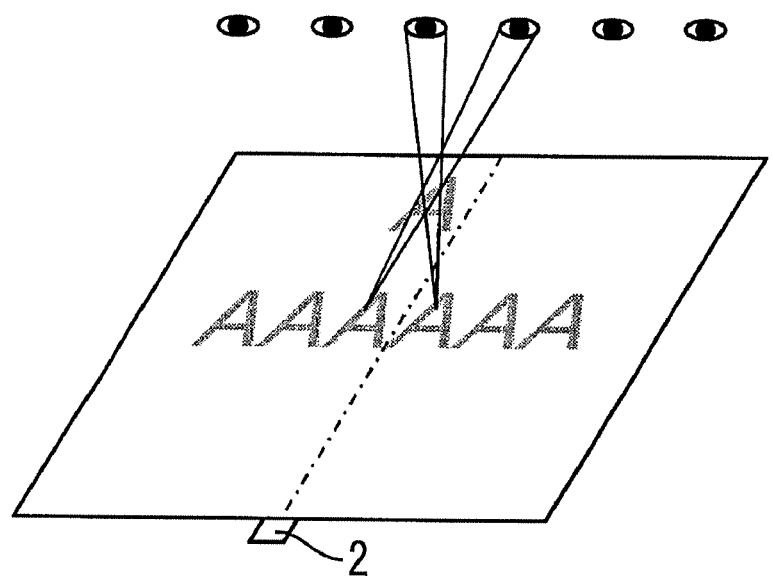
FIG. 20B is a perspective view illustrating a stereoscopic image produced from parallax images arranged at equal pitch when the viewpoints are at equal pitch along the horizontal direction.
Figure 20C:
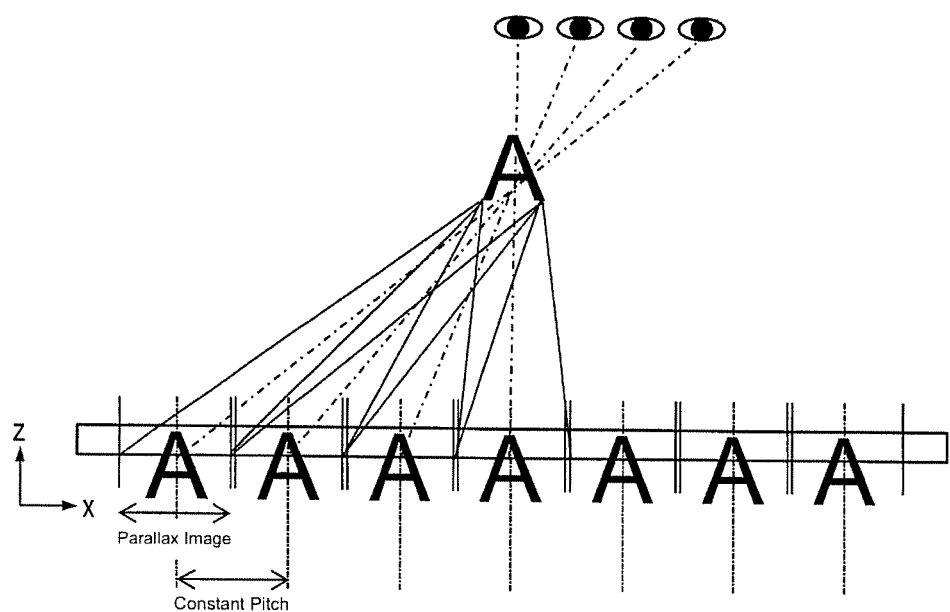
FIG. 20C is a cross-sectional view of the xz plane illustrating a stereoscopic image produced from parallax images at equal pitch.

The configuration of an optical device 1C according to the third embodiment is described on the basis of FIGS. 20A, 20B, and 20C through FIG. 22. FIG. 20A is a plan view illustrating viewpoints established at equal pitch along a horizontal direction; and FIG. 20B is a perspective view illustrating a stereoscopic image produced from parallax images arranged at equal pitch when the viewpoints are at equal pitches along the horizontal direction. FIG. 20C is a cross-sectional view of the xz plane illustrating a stereoscopic image produced from parallax images at equal pitch.

Typically, an equal pitch is established when parallax images are used to form a stereoscopic image I (FIG. 20A). The parallax images are also formed at equal pitch as a consequence (FIG. 20B and FIG. 20C). Similar to the optical device 1A of the previous embodiment, the optical device 1B forms the parallax images with the same resolution in the space within a wide view direction and in the space within a narrow view direction. The parallax image formed in the space within a wide view direction is blurry as a result.

Therefore, in the optical device 1C of the third embodiment aligns a plurality of pairs of parallax images horizontally where each pair is made up of a right-eye parallax image and a left-eye parallax image; at the same time, for example, the group of wide-view optical-path deflectors 28 forms adjacent parallax images so that the pitch widens.

Figure 21A:
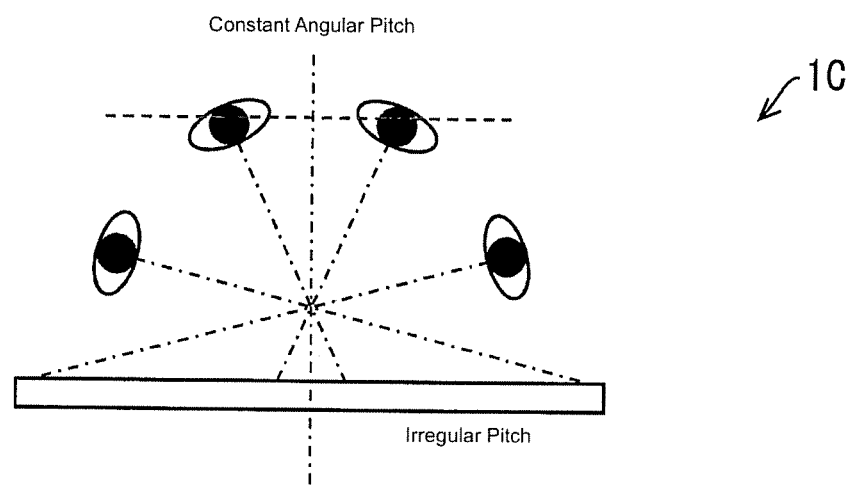
FIG. 21A illustrates an optical device according to a third embodiment of the present invention and is a plan view illustrating the arrangement of the group of wide-view optical-path deflectors at a constant angle pitch when the stereoscopic image is produced from parallax images.
Figure 21B:
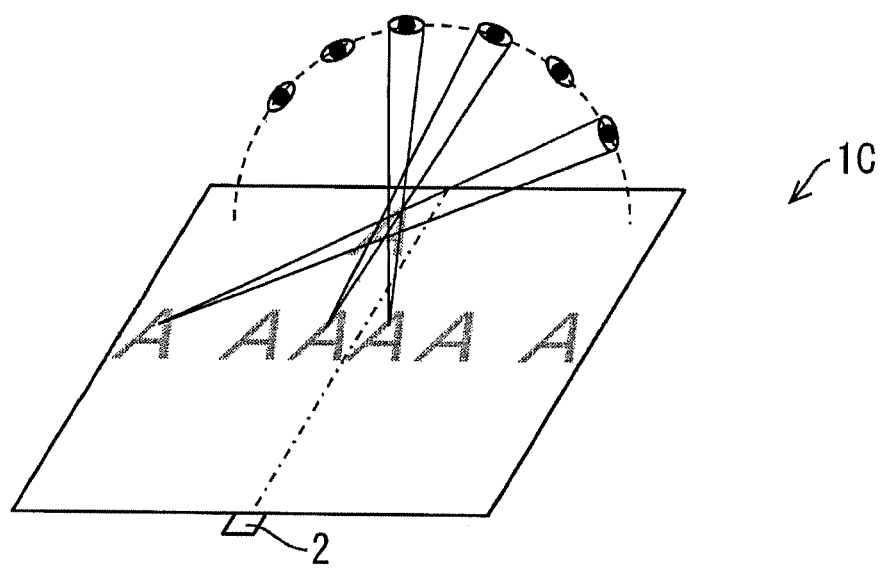
FIG. 21B is a perspective view showing where the interval between neighboring parallax images increases with the widening of the viewing angle.
Figure 21C:
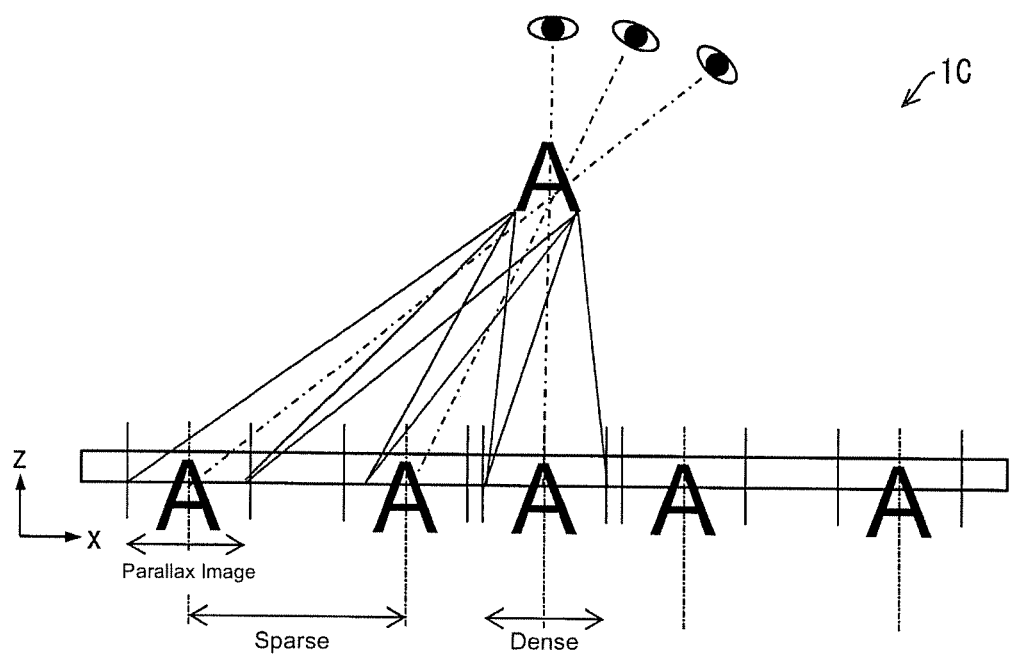
FIG. 21C is a cross-sectional view of the xz plane showing a stereoscopic image produced from parallax images placed at different pitches.
Figure 22:
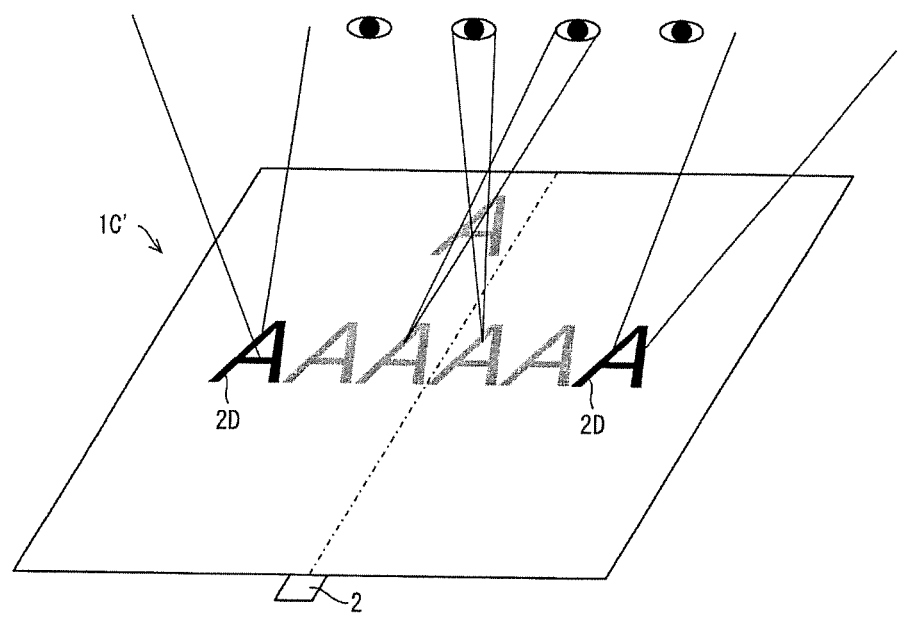
FIG. 22 is an example of modifying the optical device according to the third embodiment and is a perspective view illustrating the optical device forming a two-dimensional image in an area outside an established wide viewing angle when the optical device uses parallax images to form the stereoscopic image.

More specifically, an equal pitch is established when parallax images are used to form a stereoscopic image I (FIG. 21A). The parallax images are also formed so that the pitch between adjacent parallax images widens with an increase in the wide viewing angle (FIG. 21B and FIG. 21C).

Thus, an optical device may be provided that is capable of preventing the visibility of a stereoscopic image from deteriorating in a space within a wide view direction even for a parallax image.

The embodiment is not limited hereto, and other methods may be adopted. For example, consider an optical device 1C' that forms a two-dimensional image 2D in a region outside the established wide viewing angle.

In this case, an optical device 1C' may be provided that is capable of preventing the visibility of a stereoscopic image from deteriorating in a space within a wide view direction even for a parallax image, similarly to the optical device 1A of the first embodiment.

Fourth Embodiment

A fourth embodiment of the present invention is described below with reference to FIG. 23. The configurations not described in the fourth embodiment are identical to the previously described first through third embodiments. For the sake of convenience, components previously described in the first through third embodiments that have an identical function are given the same reference numerals, and explanations therefor are omitted.

An optical device 1D of the fourth embodiment configured with the light source 2 installed at a corner of the light guide plate 10.

Figure 23A:
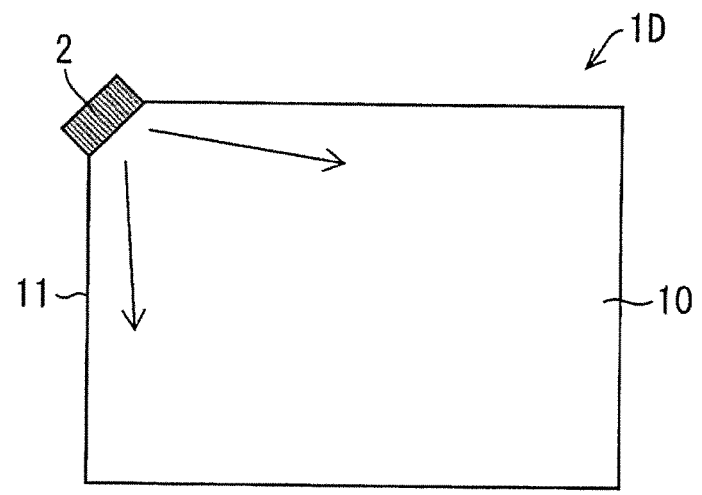
FIGS. 23A and 23B are plan views of a fourth embodiment of the present invention, and illustrate a configuration of the optical device where the light source is place at a corner of the light guide plate.
Figure 23B:
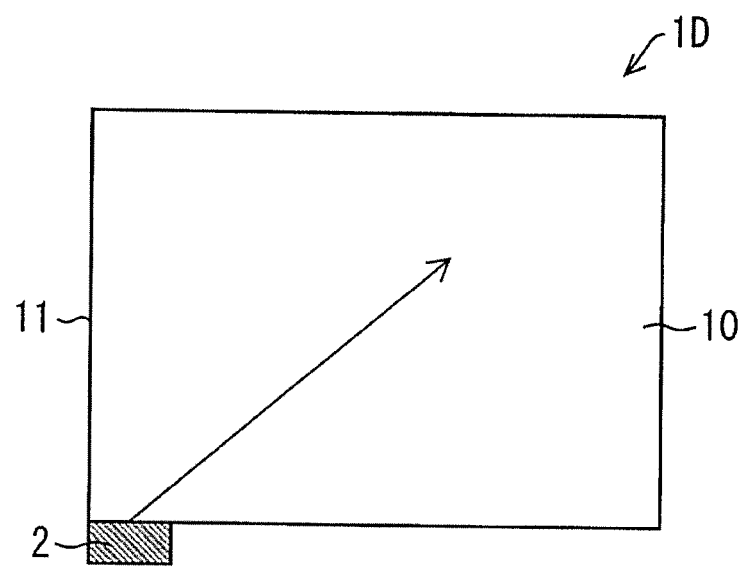

The configuration of an optical device 1D according to the fourth embodiment is described on the basis of FIGS. 23A and 23B. FIGS. 23A and 23B are plan views illustrating a configuration of the optical device 1D of the fourth embodiment where the light source 2 is place at a corner of the light guide plate 10.

The direction of the narrow viewing angle and the direction of the wide viewing angle are defined in the optical device 1A-1D of the first through fourth embodiments assuming that an observer is moving and that the reference plane BL is orthogonal to a horizontal surface.

The optical device 1D may be configured so that the light source 2 is at an upper or lower side surface. In this case, the group of wide-view optical-path deflectors 28 in particular must greatly deflect light traveling vertically from the light source 2 so that the light exits horizontally toward the wide view direction when reflected from the group of wide-view optical-path deflectors 28. That is, light intensity decreases in the wide view direction.

In contrast, light from the light source 2 may irradiate the group of wide-view optical-path deflectors 28 and the group of narrow-view optical-path deflectors 27 laterally; here, the light from the light source 2 interferes with neighboring groups of optical-path deflectors. A less than suitable stereoscopic image is presented as a result.

Therefore, the light source 2 in the optical device 1D of the fourth embodiment is configured to irradiate the group of narrow-view optical-path deflectors 27 and the group of wide-view optical-path deflectors 28 from a direction inclined relative to the reference plane BL (FIG. 23A).

Thus, there is no interference between neighboring groups of optical-path deflectors, and the angle at which light from the light source 2 must be deflected is also reduced. It is therefore possible to increase the light intensity of light reflected toward the wide view direction.

The optical device 1D of the fourth embodiment may also effectively shift the two-dimensional images 2D shown in FIG. 15 by installing the light source 2 at a corner of the light guide plate 10 (FIG. 23B).

Fifth Embodiment

A fifth embodiment of the present invention is described below with reference to FIG. 24A through FIG. 27B. The configurations not described in the fifth embodiment are identical to the previously described first through fourth embodiments. For the sake of convenience, components previously described in the first through fourth embodiments that have an identical function are given the same reference numerals, and explanations therefor are omitted.

The optical device 1E of the fifth embodiment presents a stereoscopic image I that exhibits thickness.

Figure 24A:
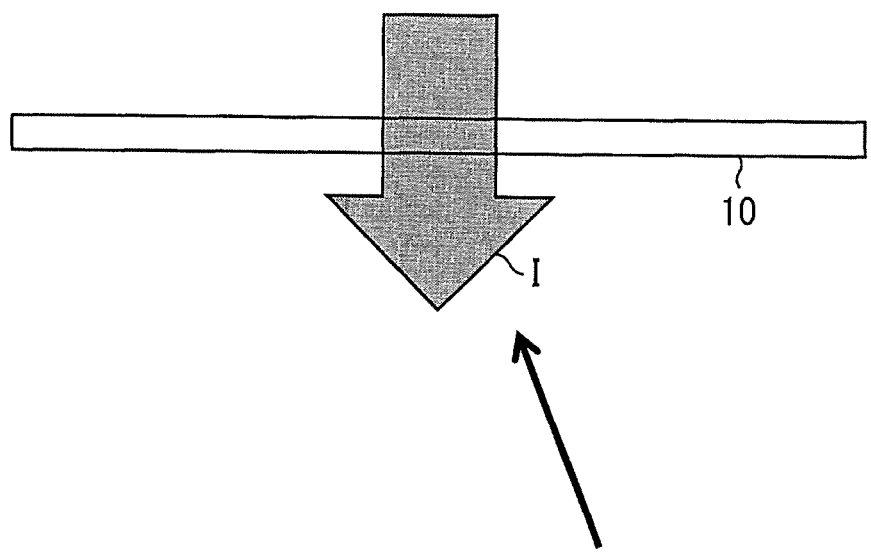
FIG. 24A is a plan view illustrating when the stereoscopic image is viewed from a narrow view direction.
Figure 24B:
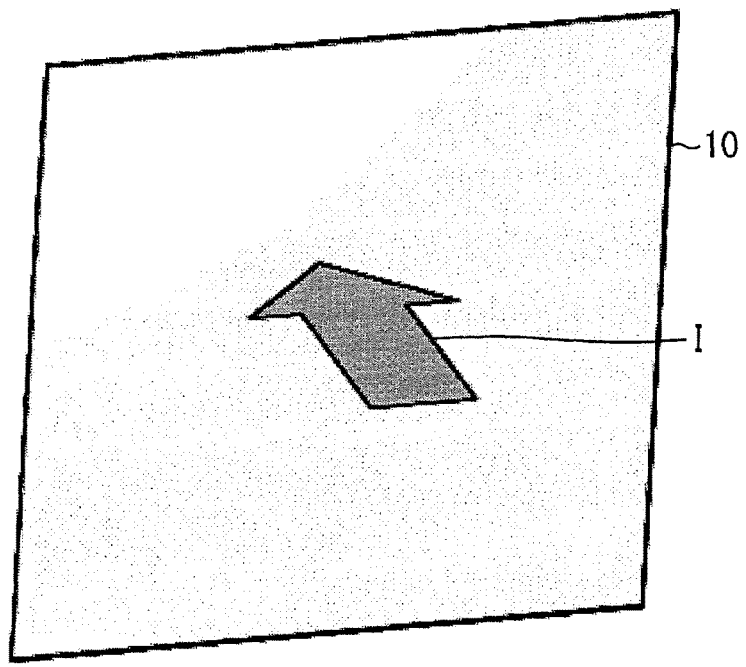
FIG. 24B is a perspective view illustrating how the stereoscopic image appears when viewed from the narrow view direction.
Figure 25A:
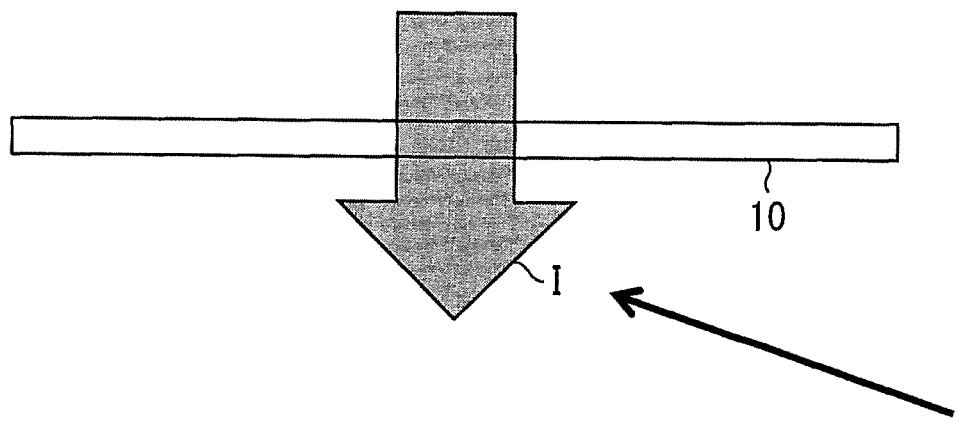
FIG. 25A is a plan view illustrating when the stereoscopic image is viewed from a wide view direction.
Figure 25B:
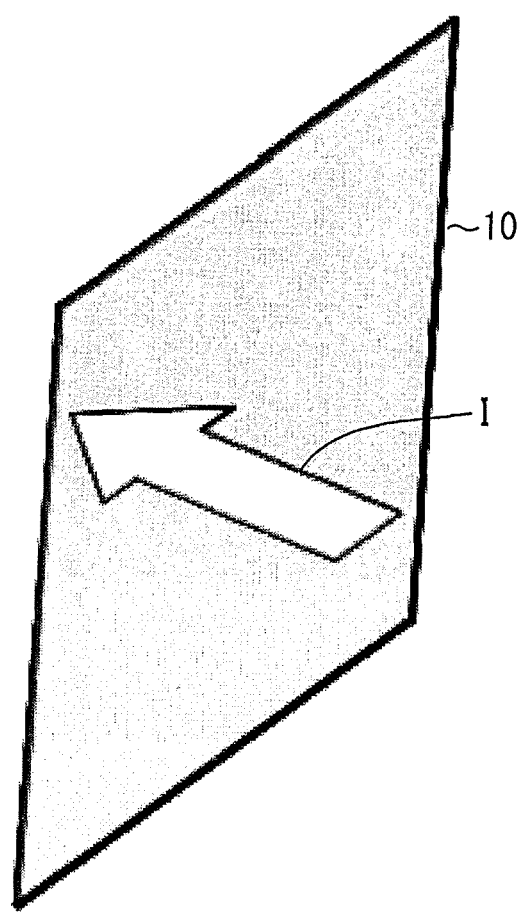
FIG. 25B is a perspective view illustrating how the stereoscopic image appears when viewed from the wide view direction.
Figure 26A:
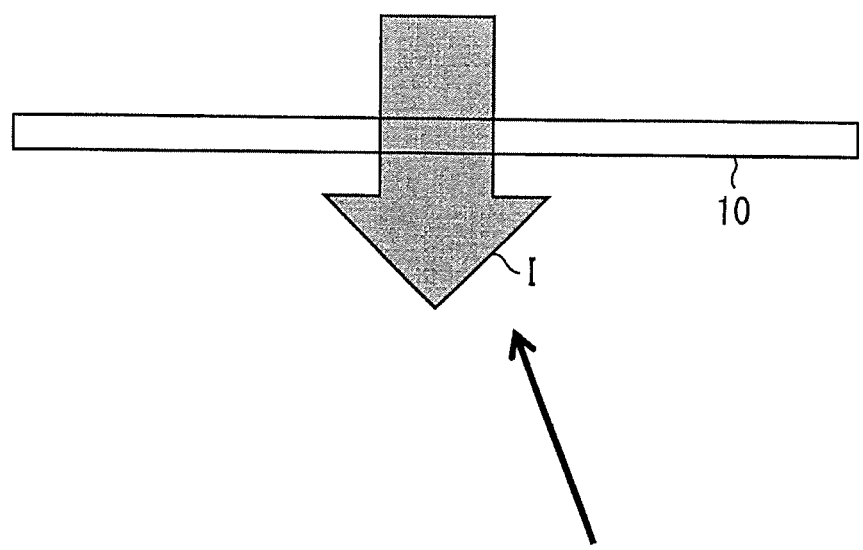
FIG. 26A is a plan view of a fifth embodiment of the present invention and illustrates when the stereoscopic image is viewed from a narrow view direction.
Figure 26B:
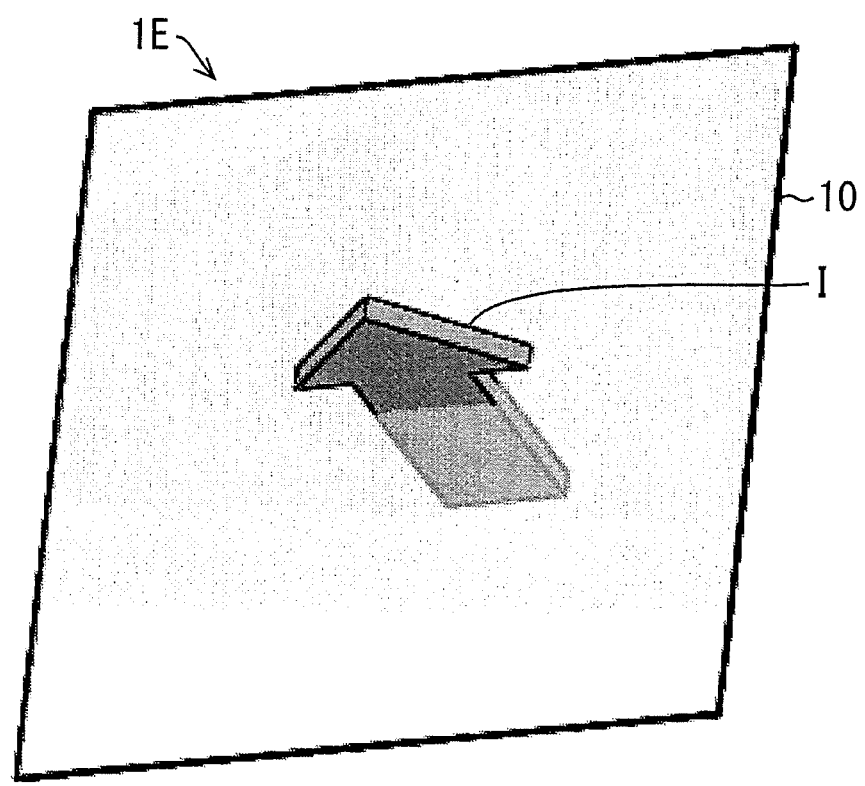
FIG. 26B is a perspective view illustrating how the stereoscopic image appears when viewed from the narrow view direction.
Figure 27A:
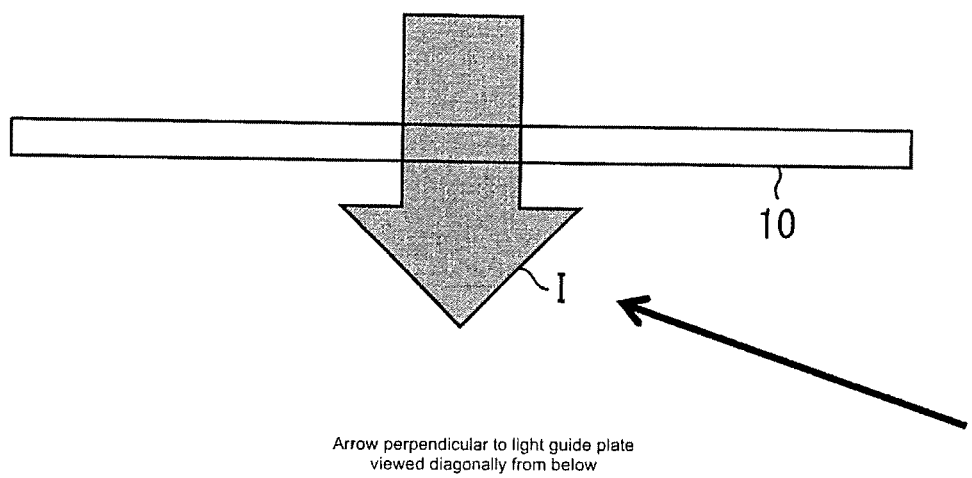
FIG. 27A is a plan view of a fifth embodiment of the present invention and illustrates when the stereoscopic image is viewed from a wide view direction.
Figure 27B:
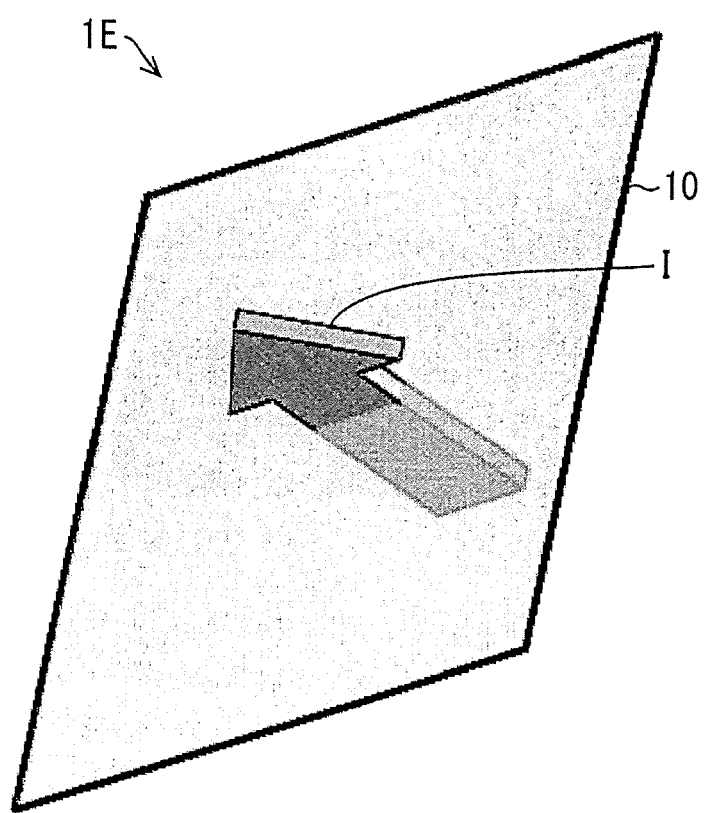
FIG. 27B is a perspective view illustrating how the stereoscopic image appears when viewed from the wide view direction.
Figure 28A:
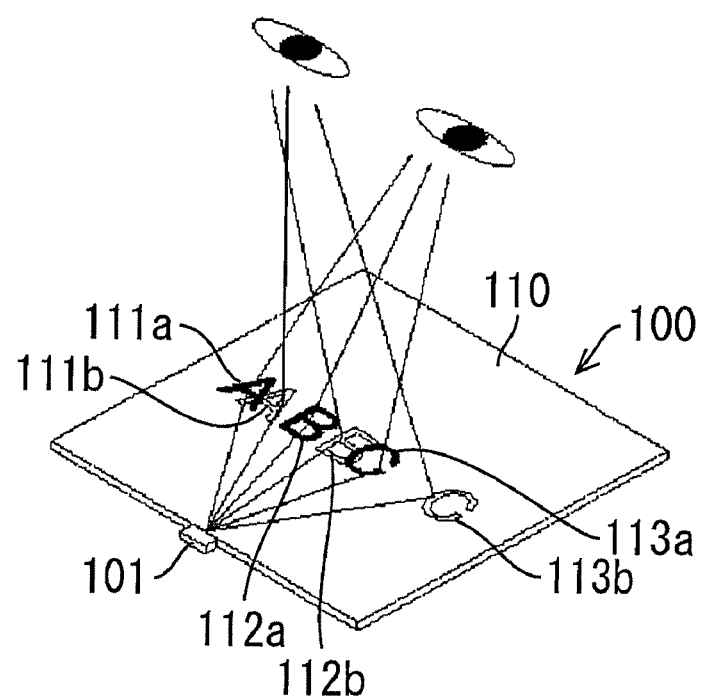
FIG. 28A through 28C illustrate configurations of an image display device serving as a conventional optical device.
Figure 28B:
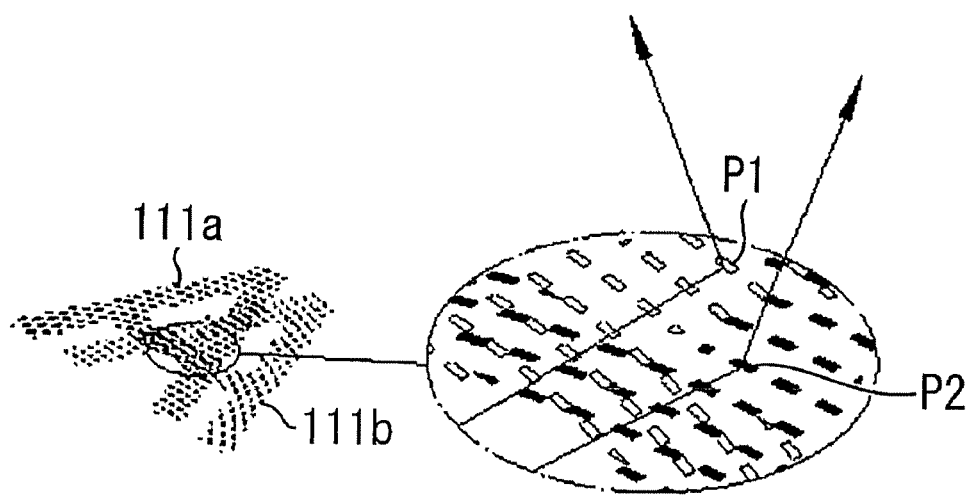
Figure 28C:
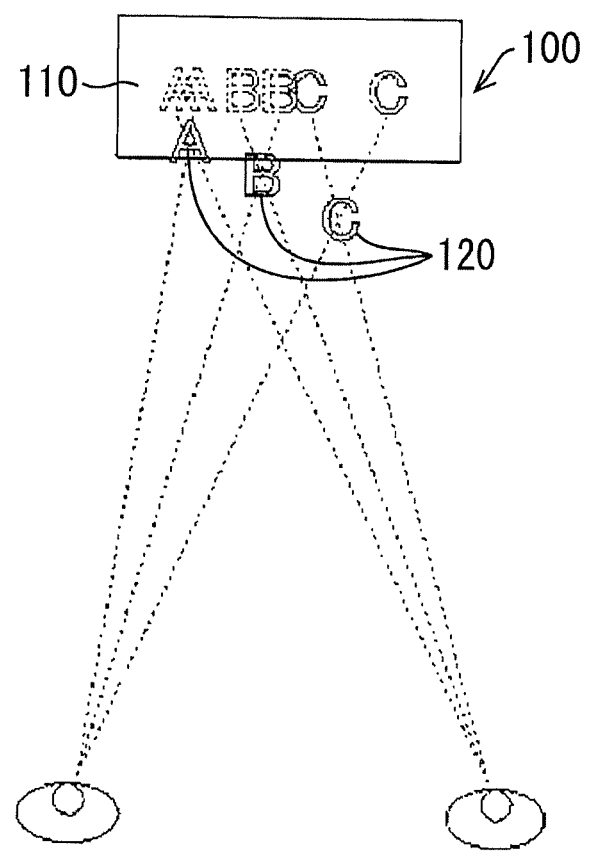

The configuration of an optical device 1E according to the fifth embodiment is described on the basis of FIGS. 24A and 24B through FIGS. 27A and 27B. FIG. 24A is a plan view illustrating when the stereoscopic image I is viewed from a narrow view direction; and FIG. 24B is a perspective view illustrating how the stereoscopic image I appears when viewed from the narrow view direction. FIG. 25A is a plan view illustrating when the stereoscopic image I is viewed from a wide view direction; and FIG. 25B is a perspective view illustrating the appearance of the stereoscopic image I when the stereoscopic image I is viewed from the wide view direction. FIG. 26A is a plan view of the optical device 1E of the fifth embodiment and illustrates when the stereoscopic image I is viewed from a narrow view direction; and FIG. 26B is a perspective view illustrating how the stereoscopic image I appears when viewed from the narrow view direction. FIG. 27A is a plan view of the optical device 1E of the fifth embodiment and illustrates when the stereoscopic image I is viewed from a wide view direction; and FIG. 27B is a perspective view illustrating the appearance of the stereoscopic image I when the stereoscopic image I is viewed from the wide view direction.

For instance, a stereoscopic image I constituted by an arrow may be formed orthogonally to the light guide plate 10 (FIG. 24A); the stereoscopic image I tends to exhibit three dimensionality (FIG. 24B) when viewed from below from a narrow view direction. In contrast, the stereoscopic image I constituted by an arrow is formed orthogonally to the light guide plate 10 (FIG. 25A); however, the stereoscopic image I loses three dimensionality (FIG. 25B) when viewed from diagonally below from a wide viewing angle.

Therefore, the optical device 1E of the fifth embodiment presents a stereoscopic image I that exhibits thickness. According to one or more embodiments of the present invention, the stereoscopic image I is given the appearance of thickness, particularly from a wide view direction. Hereby, a stereoscopic image I constituted by an arrow may be formed orthogonally to the light guide plate 10 (FIG. 26A); the stereoscopic image I tends to exhibit three dimensionality (FIG. 26B) when viewed from below from a narrow view direction. Additionally, the stereoscopic image I constituted by an arrow is formed orthogonally to the light guide plate 10 (FIG. 27A); when viewed from diagonally below from the wide viewing angle, a line along the thickness direction hints at the shape of the stereoscopic image I (FIG. 27B). Therefore, the image presented can be easily recognized as a stereoscopic image I constituted as an arrow formed orthogonally to the light guide plate 10.

The present invention is not limited to each of the above described embodiments, and may be modified in various ways and remain within the scope of the claims. The technical means disclosed in each of the different embodiments may be combined as appropriate, and an embodiment obtained in such a manner remains within the technical scope of the present invention.

Thus, as above described, an optical device according to one or more embodiments of the present invention is configured such that the optical device includes: a light guide plate configured to guide light entering therein from a light source, change the optical path of light guided, and cause said light to exit from an emission surface of the light guide plate and thereby form an image in a space; a group of narrow-view optical-path deflectors configured to form an image in a space within a narrow view direction taken as greater than or equal to 0° and less than a first angle relative to a reference plane that is orthogonal to the emission surface and parallel to a side surface of the light guide plate; and a group of wide-view optical-path deflectors configured to form an image in a space within a wide view direction taken as greater than or equal to the first angle and less than 90° relative to the reference plane; the group of narrow-view optical-path deflectors and the group of wide-view optical-path deflectors with different image forming conditions.

The optical device is equipped with a light guide plate that guides light entering therein from the light source and changes the optical path of the light guided thereby, causing the light to exit from the emission surface and form an image in a space.

The visibility of stereoscopic image formed by this optical device degrades since the stereoscopic image is blurry within a wide viewing angle when the optical device forms the stereoscopic image.

To address this, the optical device according to one or more embodiments of the present invention includes a group of narrow-view optical-path deflectors configured to form an image in a space within a narrow view direction taken as greater than or equal to 0° and less than a first angle relative to a reference plane that is orthogonal to the emission surface and parallel to a side surface of the light guide plate; and a group of wide-view optical-path deflectors configured to form an image in a space within a wide view direction taken as greater than or equal to the first angle and less than 90° relative to the reference plane; and the group of narrow-view optical-path deflectors and the group of wide-view optical-path deflectors with different image forming conditions.

As a result, it is possible to ensure the stereoscopic image is not blurry at a wide viewing angle. It is thus possible to provide an optical device that is capable of preventing the visibility of a stereoscopic image from deteriorating in a space within a wide view direction.

In the optical device according to one or more embodiments of the present invention, the group of narrow-view optical-path deflectors form a stereoscopic image in a space different from the light guide plate while the group of wide-view optical-path deflectors form a two-dimensional image on the emission surface of the light guide plate.

In the optical device according to one or more embodiments of the present invention, the group of wide-view optical-path deflectors is configured to form the two-dimensional image at a location that is fixed and independent of the angle in the wide view direction.

Hereby the group of wide-view optical-path deflectors forms an image in a space within a wide view direction taken as greater than or equal to the first angle and less than 90° relative to a reference plane.

Therefore, two-dimensional image is formed in a space within a wide view direction making it possible to present an image that is not blurry. A stereoscopic image formed in a space within a wide view direction is almost no different from a two-dimensional image even if the stereoscopic image happens to be non-blurry. That is, there is less sense of unease when seeing a sharp two-dimensional image versus seeing a blurry stereoscopic image.

It is thus possible to provide an optical device that is capable of preventing the visibility of a stereoscopic image from deteriorating in a space within a wide view direction.

In the optical device according to one or more embodiments of the present invention, the group of wide-view optical-path deflectors is configured to form the two-dimensional image at a location that changes in accordance with the angle in the wide view direction.

Thus, when forming the two-dimensional image on the emission surface of the light guide plate, the optical device can shift where the two-dimensional image is formed to a different location on the emission surface of the light guide plate as the viewing angle increases. As a result, it is possible to create a presentation effect where the two-dimensional image moves in accordance with moving from a wide viewing angle to a narrow viewing angle and where the two-dimensional image switches to a stereoscopic image from a specific viewing angle.

In the optical device according to one or more embodiments of the present invention, the group of wide-view optical-path deflectors is arranged at a larger pitch than the group of narrow-view optical-path deflectors.

In other words, the stereoscopic image is formed at a short distance from the emission surface of the light guide plate in a space within a narrow view direction that is greater than or equal to 0° and less than the first angle relative to the reference plane. Whereas, the stereoscopic image is formed at a long distance from the light guide plate via the emission surface of the light guide plate in a space within a wide view direction that is greater than or equal to the first angle $\alpha$ and less than 90° relative to the reference plane.

Consequently, blurring is obvious for a stereoscopic image formed in the space within a wide view direction when stereoscopic images are formed with the same resolution in the space within a wide view direction and in the space within a narrow view direction.

Therefore, according to one or more embodiments of the present invention, the group of wide-view optical-path deflectors is arranged at a larger pitch than the group of narrow-view optical-path deflectors. Thus, the stereoscopic image in the space within a wide view direction has a lower resolution than the stereoscopic image in the space within a narrow view direction. The blurring of the stereoscopic image in the space within a wide view direction thus becomes less obvious.

Accordingly, an optical device provided via this method is capable of preventing the visibility of a stereoscopic image from deteriorating in a space within a wide view direction.

In the optical device according to one or more embodiments of the invention, the group of narrow-view optical-path deflectors and the group of wide-view optical-path deflectors contain a plurality of aligned groups of second optical-path deflectors made up of a plurality of second optical-path deflectors configured to form a point image, whereby the second optical-path deflectors appear to form a line image.

Thus, a point image of strong light intensity is formed because each of the second optical-path deflectors forms a single point image. Because there is a plurality of groups of second optical-path deflectors, the point images formed by the groups of second optical-path deflectors appear and are perceived as a line image when aligned.

Therefore, the groups of second optical-path deflectors formed in the light guide plate to function as the group of narrow-view optical-path deflectors and the group of wide-view optical-path deflectors tend to produce a stereoscopic image made up of a line image that has strong light intensity.

In the optical device according to one or more embodiments of the invention, the group of narrow-view optical-path deflectors and the group of wide-view optical-path deflectors contain a plurality of aligned groups of first optical-path deflectors made up of a plurality of first optical-path deflectors configured to form a line image, whereby the first optical-path deflectors appear to form a planar image.

Therefore, the groups of first optical-path deflectors formed in the light guide plate to function as the group of narrow-view optical-path deflectors and the group of wide-view optical-path deflectors tend to form a line image that is a portion of a planar image. The plurality of groups of first optical-path deflectors therefore increases the thickness of the line image. Therefore, the line image appears to form a two-dimensional planar image.

Accordingly, the groups of first optical-path deflectors formed in the light guide plate to function as the group of narrow-view optical-path deflectors and the group of wide-view optical-path deflectors tend to form a two-dimensional planar image FI.

In the optical device according one or more embodiments of the present invention, the group of wide-view optical-path deflectors contains groups of fourth optical-path deflectors in a plurality of sections with a single section including a group of fourth optical-path deflectors constituted by a plurality of fourth optical-path deflectors, a group of fourth optical-path deflectors configured to form a single point image; and the group of wide-view optical-path deflectors in the optical device configured to group the point images whereby the two-dimensional image appears to present a planar image.

Hereby, a more concrete two-dimensional image may be formed.

In the optical device according to one or more embodiments of the present invention, the group of narrow-view optical-path deflectors includes reflection surfaces configured to form an image in a space within a narrow view direction taken as greater than or equal to 0° and less than a first angle relative to the reference plane; and the group of wide-view optical-path deflectors includes reflection surfaces configured to form an image in a space within a wide view direction taken as greater than or equal to the first angle and less than 90° relative to the reference plane.

Therefore, distinct images may be formed in a space within a narrow view direction and in a space within a wide view direction respectively from the same light source; this may be the case even when the group of narrow-view optical-path deflectors and the group of wide-view optical-path deflectors are both provided in the light guide plate.

In the optical device according to one or more embodiments of the present invention, the aforementioned image is constituted from parallax images, and a plurality of pairs of the parallax images, each pair made up of a right-eye parallax image and a left-eye parallax image are horizontally aligned.

Thus, an optical device may be provided that is capable of preventing the visibility of a stereoscopic image from deteriorating in a space within a wide view direction even for a parallax image.

In the aforementioned optical device, according to one or more embodiments of the invention, the group of narrow-view optical-path deflectors and the group of wide-view optical-path deflectors are irradiated with light from a direction diagonal to the reference plane.

That is, the direction of the narrow viewing angle and the direction of the wide viewing angle are defined in one or more embodiments of the present invention assuming that an observer is moving and that the reference plane is orthogonal to a horizontal surface.

The optical device may be configured so that the light source is at an upper or lower side surface. In this case, the group of wide-view optical-path deflectors in particular must greatly deflect light traveling vertically from the light source so that the light exits horizontally toward the wide view direction when reflected from the group of wide-view optical-path deflectors. Consequently, the light intensity decreases in the wide view direction.

In contrast, light from the light source may irradiate the group of wide-view optical-path deflectors and the group of narrow-view optical-path deflectors laterally; here, the light from the light source interferes with neighboring groups of optical-path deflectors. A less than suitable stereoscopic image is presented as a result.

Therefore, in the optical device according to one or more embodiments of the invention, the group of narrow-view optical-path deflectors and the group of wide-view optical-path deflectors are irradiated with light from a direction diagonal to the reference plane.

Thus, there is no interference between neighboring groups of optical-path deflectors, and the angle at which light from the light source must be deflected is also reduced. It is therefore possible to increase the light intensity of light reflected toward the wide view direction.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An optical device comprising:
   a light guide plate configured to guide light entering therein from a light source, and cause said light to exit from an emission surface of the light guide plate; and
   a plurality of optical-path deflectors arranged in the light guide plate and configured to change an optical path of light, which has been directed to the plurality of optical-path deflectors, so that the light exits from the light guide plate and forms an image in a space;
   the plurality of optical-path deflectors including a plurality of groups of optical-path deflectors, the plurality of groups of optical-path deflectors including:
   a group of narrow-view optical-path deflectors configured to form an image in a space within a narrow view direction taken as greater than or equal to 0° and less than a first angle relative to a reference plane that is orthogonal to the emission surface and parallel to a side surface of the light guide plate; and
   a group of wide-view optical-path deflectors configured to form an image in a space within a wide view direction taken as greater than or equal to the first angle and less than 90° relative to the reference plane;
   wherein the group of narrow-view optical-path deflectors and the group of wide-view optical-path deflectors have different image forming conditions,
   wherein an interval between the group of wide-view optical-path deflectors and optical-path deflectors which are adjacent to the group of wide-view optical-path deflectors and are nearest to the group of wide-view optical-path deflectors is greater than that between the group of narrow-view optical-path deflectors and optical-path deflectors which are adjacent to the group of narrow-view optical-path deflectors and are nearest to the group of narrow-view optical-path deflectors.

2. The optical device according to claim 1,
   wherein the group of narrow-view optical-path deflectors and the group of wide-view optical-path deflectors contain a plurality of aligned groups of second optical-path deflectors made up of a plurality of second optical-path deflectors configured to form a point image, whereby the second optical-path deflectors appear to form a line image.

3. The optical device according to claim 1, wherein the group of narrow-view optical-path deflectors and the group of wide-view optical-path deflectors contain a plurality of aligned groups of first optical-path deflectors made up of a plurality of first optical-path deflectors configured to form a line image, whereby the first optical-path deflectors appear to form a planar image.

4. The optical device according to claim 1, wherein the group of narrow-view optical-path deflectors includes reflection surfaces configured to form an image in a space within a narrow view direction taken as greater than or equal to 0° and less than a first angle relative to the reference plane, and wherein the group of wide-view optical-path deflectors includes reflection surfaces configured to form an image in a space within a wide view direction taken as greater than or equal to the first angle and less than 90° relative to the reference plane.

5. The optical device according to claim 1, wherein the group of narrow-view optical-path deflectors and the group of wide-view optical-path deflectors are irradiated with light from a direction diagonal to the reference plane.

\* \* \* \* \*